US011922778B2

(12) United States Patent
Hendricks et al.

(10) Patent No.: US 11,922,778 B2
(45) Date of Patent: Mar. 5, 2024

(54) ELECTRONIC GAMING DEVICE WITH SWITCHABLE GAMING STATES

(71) Applicant: Aristocrat Technologies Australia Pty Limited, North Ryde (AU)

(72) Inventors: Bradley Hendricks, Las Vegas, NV (US); Allon Englman, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/184,180

(22) Filed: Mar. 15, 2023

(65) Prior Publication Data

US 2023/0237878 A1 Jul. 27, 2023

Related U.S. Application Data

(63) Continuation of application No. 17/479,572, filed on Sep. 20, 2021, now Pat. No. 11,631,302, which is a continuation of application No. 16/557,463, filed on Aug. 30, 2019, now Pat. No. 11,151,842.

(51) Int. Cl.
*G07F 17/32* (2006.01)

(52) U.S. Cl.
CPC ...... *G07F 17/3267* (2013.01); *G07F 17/3227* (2013.01); *G07F 17/3244* (2013.01)

(58) Field of Classification Search
CPC ............. G07F 17/3267; G07F 17/3227; G07F 17/3244
See application file for complete search history.

(56) References Cited

U.S. PATENT DOCUMENTS

| | | | |
|---|---|---|---|
| 9,058,717 | B2 | 6/2015 | Aoki |
| 2002/0025848 | A1 | 2/2002 | Graham |
| 2005/0054429 | A1 | 3/2005 | Baerlocher |
| 2007/0060271 | A1 | 3/2007 | Cregan |
| 2010/0029369 | A1 | 2/2010 | Pacey |
| 2011/0028202 | A1 | 2/2011 | Naicker |
| 2013/0217466 | A1 | 8/2013 | Fujisawa |

(Continued)

OTHER PUBLICATIONS

Office Action dated Apr. 1, 2021 for U.S. Appl. No. 16/557,463 (pp. 1-22).

(Continued)

*Primary Examiner* — David L Lewis
*Assistant Examiner* — Shauna-Kay Hall
(74) *Attorney, Agent, or Firm* — Blank Rome LLP

(57) ABSTRACT

Innovations in user interface ("UI") features of an electronic gaming device, and in features of backend processing to implement the UI features, are presented. For example, control logic selects symbols to be displayed for dynamic symbols for reel strips used in the electronic gaming device. The symbols selected to be displayed for dynamic symbols differ between game types. An electronic gaming machine can be associated with different gameplay divisions, such as different wager levels. Different gameplay divisions can be associated with different states, such as being in a base game mode or a special event mode, or having different numbers of spins remaining in a special event mode. A user can switch between gameplay divisions, where a state is resumed when a user switches to a different gameplay division.

21 Claims, 22 Drawing Sheets

(56) References Cited

U.S. PATENT DOCUMENTS

| | | | | |
|---|---|---|---|---|
| 2014/0031101 | A1* | 1/2014 | Jaffe | G07F 17/3262 463/20 |
| 2015/0018071 | A1 | 1/2015 | Elias | |
| 2016/0049038 | A1* | 2/2016 | Nakamura | G07F 17/3267 463/20 |
| 2017/0103613 | A1 | 4/2017 | Berman | |
| 2018/0276948 | A1 | 9/2018 | Washington | |
| 2019/0073878 | A1 | 3/2019 | Kendall | |
| 2019/0228613 | A1 | 7/2019 | Delekta | |
| 2020/0388111 | A1 | 12/2020 | Pierer | |

OTHER PUBLICATIONS

Notice of Allowance dated Jun. 30, 2021 for U.S. Appl. No. 16/557,463 (pp. 1-9).
Office Action (Notice of Allowance and Fees Due (PTOL-85)) dated Jan. 18, 2023 for U.S. Appl. No. 17/479,572 (pp. 1-8).

* cited by examiner 804, 816, 806, 808, 810, 818

| Play/9 | 1 | 2 | 3 | 4 | 5 | 6 | 7 | 8 | 9 | Total |
|---|---|---|---|---|---|---|---|---|---|---|
| Low | 1450 | 1450 | 1450 | 1325 | 1325 | 1300 | 1000 | 500 | 500 | 10300 |
| Medium | 47 | 47 | 47 | 172 | 172 | 172 | 425 | 700 | 500 | 2282 |
| High | 3 | 3 | 3 | 3 | 3 | 28 | 75 | 300 | 500 | 918 |
| Total | 1500 | 1500 | 1500 | 1500 | 1500 | 1500 | 1500 | 1500 | 1500 | 13500 |

FIG. 8a

830

| Play/9 | 1 | 2 | 3 | 4 | 5 | 6 | 7 | 8 | 9 | Total |
|---|---|---|---|---|---|---|---|---|---|---|
| Low | 1000 | 1000 | 1000 | 1000 | 1000 | 1000 | 1000 | 1000 | 1000 | 9000 |
| Medium | 400 | 400 | 400 | 400 | 400 | 400 | 400 | 400 | 400 | 3600 |
| High | 100 | 100 | 100 | 100 | 100 | 100 | 100 | 100 | 100 | 900 |
| Total | 1500 | 1500 | 1500 | 1500 | 1500 | 1500 | 1500 | 1500 | 1500 | 13500 |

FIG. 8b

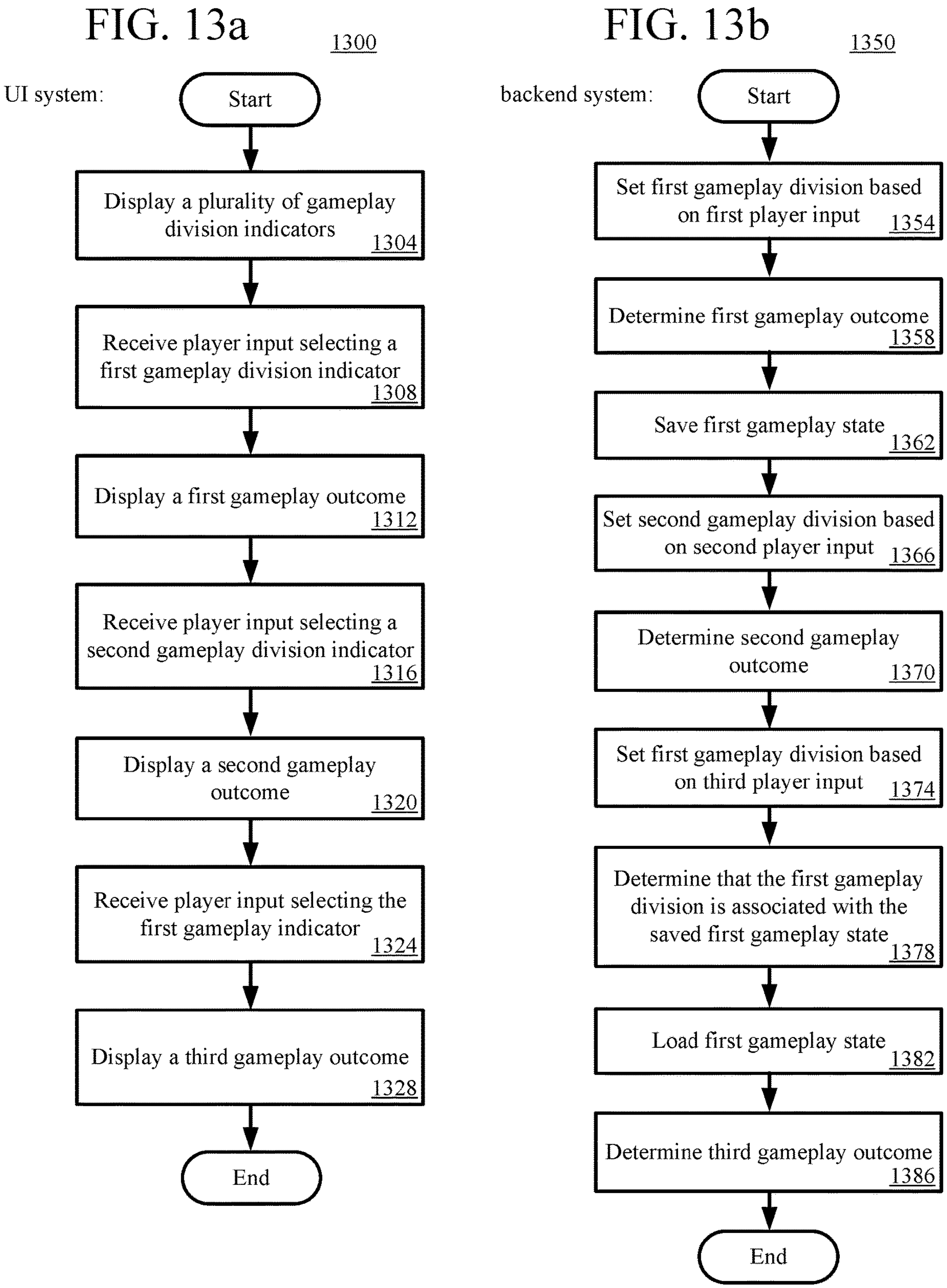
FIG. 13a
1300
UI system:
Start
Display a plurality of gameplay division indicators 1304
Receive player input selecting a first gameplay division indicator 1308
Display a first gameplay outcome 1312
Receive player input selecting a second gameplay division indicator 1316
Display a second gameplay outcome 1320
Receive player input selecting the first gameplay indicator 1324
Display a third gameplay outcome 1328
End
FIG. 13b
1350
backend system:
Start
Set first gameplay division based on first player input 1354
Determine first gameplay outcome 1358
Save first gameplay state 1362
Set second gameplay division based on second player input 1366
Determine second gameplay outcome 1370
Set first gameplay division based on third player input 1374
Determine that the first gameplay division is associated with the saved first gameplay state 1378
Load first gameplay state 1382
Determine third gameplay outcome 1386
End

ELECTRONIC GAMING DEVICE WITH SWITCHABLE GAMING STATES

CROSS-REFERENCE TO RELATED APPLICATIONS

This application is a continuation of, and claims priority to, U.S. patent application Ser. No. 17/479,572, filed on Sep. 20, 2021, which is a continuation of, and claims priority to, U.S. patent application Ser. No. 16/557,463, filed on Aug. 30, 2019, each of which applications is hereby incorporated by reference in its entirety.

TECHNICAL FIELD

User interface ("UI") features of electronic gaming devices are described herein, along with features of backend processing to implement the UI features. For example, processes for electronic gaming machines ("EGMs") that include switchable gaming states or use dynamic symbols are described.

BACKGROUND

EGMs provide a variety of wagering games such as slot games, video poker games, video blackjack games, roulette games, video bingo games, keno games, and other types of games, which are frequently offered at casinos and other locations for use by players. Play on an EGM typically involves a player establishing a credit balance by inputting money, or another form of monetary credit, and placing a wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

A "slot" type game is often presented to a player in the form of various symbols arrayed in a row-by-column grid (matrix). Specific matching combinations of symbols along predetermined paths (or "pay lines") through the matrix indicate the outcome of the game. The display typically highlights winning combinations/outcomes for ready identification by the player. Matching combinations and their corresponding awards are usually shown in a "pay table," which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typically, a game uses a random number generator ("RNG") to randomly determine the outcome of the game. A game is designed to return a certain percentage of the amount wagered back to a player over the course of many plays or instances of the game, which is generally referred to as return to player ("RTP"). The RTP and randomness of the RNG ensure the fairness of games and are highly regulated. For example, upon initiation of play, an RNG may randomly determine a game outcome, and symbols are selected which correspond to that outcome. Notably, some games may include an element of skill on the part of the player and are therefore not entirely random.

EGMs depend on usability to enhance the player's experience and extend player time on the EGMs. Although previous EGMs include various UI features, and backend operations associated with the UI features, that improve usability and enhance the player's experience, there is room for further improvement to EGMs.

SUMMARY

In summary, the detailed description presents innovations in user interface ("UI") features of electronic gaming devices, as well as innovations in features of backend processing to implement the UI features. For example, the detailed description presents processes for electronic gaming machines ("EGMs") that allow a player to select to play a game at one of multiple gameplay divisions, where a game state is saved when a player transitions to another division and is resumed when a player returns to a division. The detailed description also presents processes for selecting dynamic symbols to be used in a game, including selecting different symbols for a given dynamic symbol based on a game type. In some example implementations, the innovations improve usability of the EGMs by enhancing the player's experience, extending player time on the EGMs, and maintaining the interest of current players in the EGMs.

For example, according to a first set of innovations described herein, control logic is configured to perform UI-focused operations to control the UI of an electronic gaming device. A plurality of gameplay division indicators are displayed to a player. Player input is received at selecting a first gameplay division indicator of the plurality of gameplay divisions indicators. A first gameplay outcome for a first gameplay instance associated with the first gameplay division indicator is displayed. The first gameplay outcome is associated with a first gameplay state.

Player input is received selecting a second gameplay division indicator of the plurality of gameplay division indicators. A second gameplay outcome is displayed for a second gameplay instance associated with the second gameplay division indicator. Player input is received selecting the first gameplay indicator. A third gameplay outcome for the first gameplay instance is displayed. The third gameplay outcome is determined at least in part by the first gameplay state.

As another example, according to a second set of innovations described herein, control logic is configured to perform backend operations to control the UI of an electronic gaming device. The backend operations include setting a first gameplay division of available gameplay divisions based on first player input. A first gameplay outcome for a first gameplay instance associated with the first gameplay division is determined. The first gameplay outcome is associated with a first gameplay state. The first gameplay state is saved in response to second player input selecting a second gameplay division of the plurality of gameplay divisions. Gameplay is set to the second gameplay division based on the second player input.

A second gameplay outcome is determined for a second gameplay instance associated with the second gameplay division. Gameplay is set to the first gameplay division based on third player input. It is determined that the first gameplay division is associated with the saved first gameplay state. The saved first gameplay state is loaded. A third gameplay outcome is determined for the first gameplay instance based at least in part on the first gameplay state.

In another example, according to a third set of innovations described herein, control logic is configured to determine dynamic symbols to be used during gameplay that involves two game types. It is determined that a game is to be played in a first game type (e.g., a low RTP game type or a high RTP game type). It is determined that the game includes a reel associated with at least a first dynamic symbol. A first set of symbols associated with the first game type is determined. The first set of symbols is selected from a plurality of symbol sets. A first symbol of the first set of symbols to be displayed for the at least a first dynamic symbol is determined. An indication is sent that the first symbol should be displayed for the at least a first dynamic symbol, such as to a user interface component that causes a reel to be displayed to a player that includes the first symbol.

A first game outcome is determined for a first game play in the first game type. An indication of the first game outcome is sent, such as to a user interface component that causes the first game outcome to be displayed to a player.

It is determined that the game is to be played in a second game type. A second set of symbols is determined from the plurality of symbol sets that is associated with the second game type. A second symbol from the second set of symbols that is to be displayed for the at least a first dynamic symbol is determined. The first symbol is different than the second symbol. An indication that the second symbol should be displayed for the at least a first dynamic symbol is sent, such as to a user interface component that causes a reel to be displayed to a player that includes the second symbol.

A second game outcome for a second game play in the second game type is determined. An indication of the second game outcome is sent, such as to a user interface component that causes the second game outcome to be displayed to a player.

The innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations. The drawings are not necessarily drawn to scale.

FIGS. 8*a* and 8*b* are example weighted tables that can be used to determine a game configuration, in some embodiments.

FIGS. 13*a* and 13*b* are flowcharts illustrating example techniques for implementing an EGM that allows a player to switch between gameplay divisions, from the perspective of a UI frontend and backend, respectively.

DETAILED DESCRIPTION

Figure 1:
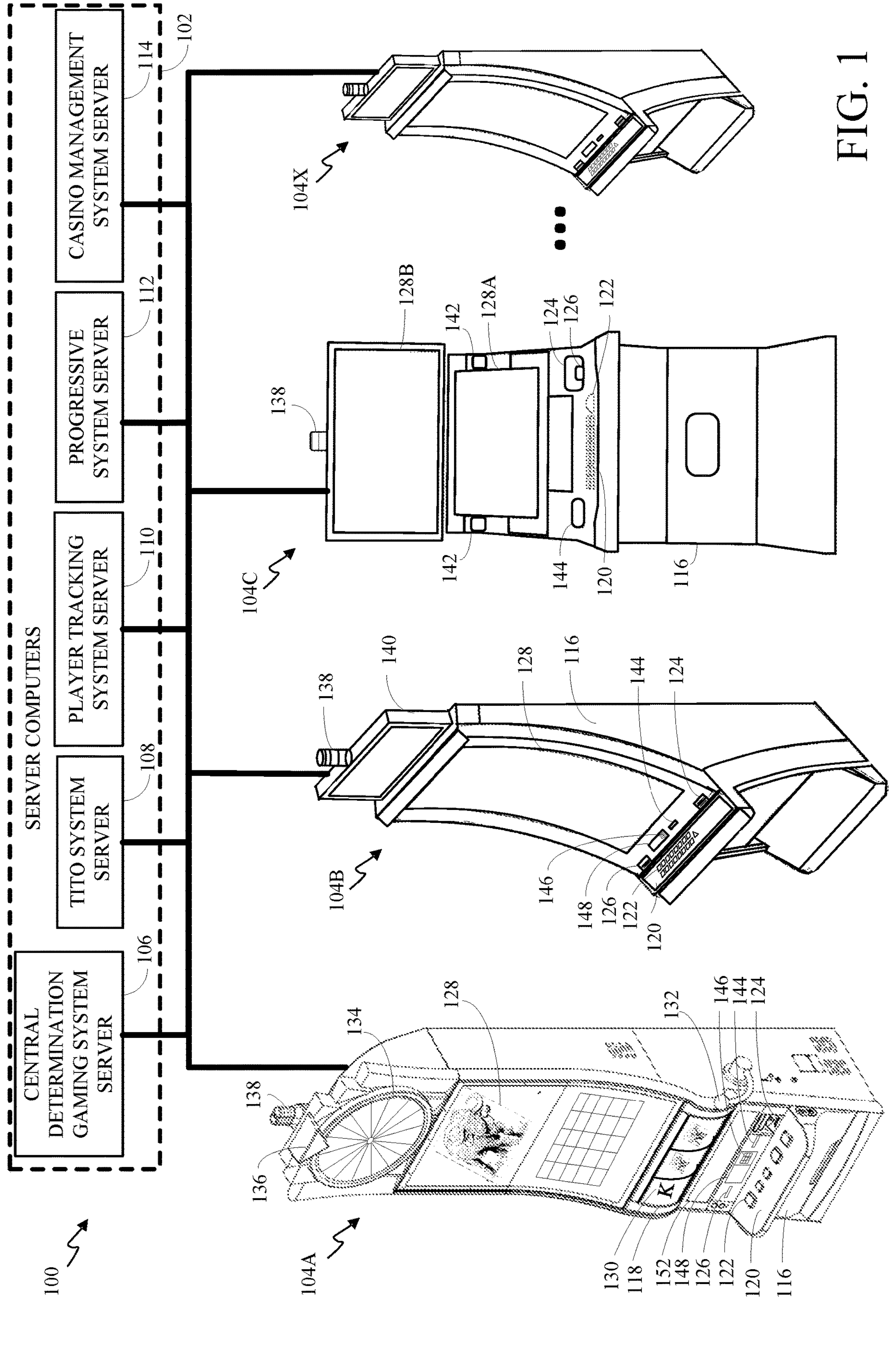
FIG. 1 is a perspective diagram of example EGMs according to some embodiments.

The detailed description presents innovations in user interface ("UI") features of electronic gaming devices, as well as innovations in features of backend processing to implement the UI features. In one embodiment, an electronic gaming machine is provided that includes a base game mode and a special event mode (which can also be referred to as a special mode or special feature of the EGM), such as a bonus game. During play of the special event mode, it can be randomly determined whether the special event mode should be triggered. Randomly determining whether the special event mode should be triggered can include a separate RNG call from RNG calls that determine a primary outcome for the base game mode, such as reel stop positions.

If the special event mode is triggered, a player is awarded a number of spins in the special event mode. The spins can require a wager, such as a wager at a particular level or amount as played for the base game mode which triggered the special event mode.

The EGM can be associated with a plurality of wager levels. The triggered special event mode is associated with a particular, first wager level. The player can select to leave or pause play of the special event mode and play a game at another wager level. The other wager level can be in a base game mode or a special event mode. When the player returns to the first wager level, the player returns to the special event mode at the state when the player left the first wager level. For example, if the player had three spins remaining when they left the first wager level, they will have three spins remaining when they return to the first wager level.

The special event mode can be associated with multiple game types. The game types can include a low RTP game type, a medium RTP game type, and a high RTP game type. A game type game can be determined from the result of an RNG call and a lookup table that includes weights to make certain outcomes more or less likely to occur according to the game designer's preferences. In some cases, the odds associated with receiving a particular game type can change, such as based on a number of remaining spins a user has in the special event mode.

A game can be associated with reel strips that have a plurality of positions or stops. At least one of the positions of a reel strip can have a dynamic symbol. Dynamic symbols can facilitate implementing different game types, such as the low, medium, and high RTP game types described above. The game type can determine a symbol used to convert a given dynamic symbol. For example, for a given dynamic symbol at a given reel strip position, the symbol displayed during a low RTP special event game type can be different than a symbol displayed during a medium RTP game type, which in turn can be different than a symbol displayed for that dynamic symbol during a high RTP game type.

In one general embodiment, including as described in Sections II-IV, processes for electronic gaming machines ("EGMs") that use dynamic symbols are described. In another general embodiment, including as described in Sections V and VI, processes for EGMs that allow play to be selected from among multiple gaming divisions are described. These embodiments can be used individually, as well as in combination as described above.

In one example, one or more reel strips can include one more dynamic symbols, where a dynamic symbol can be updated with a symbol from a group of one or more symbols. The group of symbols can include symbols that are associated with a base game mode and/or symbols that are not associated with the base game mode and instead are associated with a special event mode, including a particular game type for the special event mode.

Dynamic symbols for a reel strip, or set of reel strips, can be updated with different symbols based on a game type. In some implementations, even when a special event mode (or feature) is active, dynamic symbols can be converted to symbols found in a base game mode (including non-dynamic symbols that are fixed for the base game—such as symbols that always appear at a certain reel position). Or, during the special event mode, some, or all of the dynamic symbols may be replaced with symbols that are specific to the special event mode, including for a particular game type for the special event mode.

To vary RTP, different game types for the special event mode can have the dynamic symbols updated with different numbers of symbols specific to the special feature mode, and can include different symbols as compared with the base game mode or as compared with other game types. That is, for example, a second game type of the special event mode may have a larger number of dynamic symbols that are updated with symbols specific to the special event than are displayed during a first game type of the special event mode. Stated another way, in the second game type, the dynamic symbols are updated with special event symbols that differ from the set of symbols used for replacing dynamic symbols during the first game type.

The disclosed implementations involving dynamic symbols can have various advantages. For example, the ability to selectively change a symbol displayed for a dynamic symbol from a base game symbol to a special feature symbol can assist in ensuring regulatory compliance of an EGM. In some jurisdictions, regulators can characterize a reel strip with dynamic symbols as a single reel strip rather than multiple strips. Without the use of dynamic symbols, for a game designer to vary RTP and/or volatility, the game designer may use multiple reel strips, each with non-dynamic symbols (e.g., reel positions or stops that are associated with the same symbol whenever the reel is used, as opposed to dynamic symbols, which can be replaced with different symbols depending on different factors, such as a game type). For example, a game may use one set of reels strips during a base game and swap out the set of reel strips to another set of reel strips during a special event mode. The ability to select different symbols to be displayed for a dynamic symbol, and different numbers of dynamic symbols used in a game (e.g., a number of reel strips with dynamic symbols, a number of dynamic symbols per reel strip), can provide greater flexibility in designing game play scenarios, and in providing different RTPs for a given EGM. For example, in the event a number of dynamic symbols that display special feature-specific symbols is associated with enhanced RTP, increasing the number of special event-specific symbols that are included in a reel strip can result in greater RTP. Having game types with increased RTP can increase the time the player interacts with an EGM.

As described above, another embodiment of the present disclosure provides processes for allowing a player to selectively participate in various gameplay divisions. A gameplay division refers to a configuration of the EGM that is tracked separately and independently from other gameplay divisions. Each division can be associated with a state, where a state can describe a configuration of the EGM that will be used for a next play of the EGM in that division. A game state can indicate a game mode (e.g., base game mode or special event mode). A game state can indicate other parameters, such as a number of plays remaining in a particular game state and/or a wager level.

A player may choose to select between gameplay divisions associated with a base game and gameplay divisions associated with a special event, or to select between gameplay divisions associated with different states (including a number of remaining plays in the special event).

During a base game, a player may be awarded one or more plays in a special event. The plays can be free plays, in some examples, while in other examples the plays can require the player to place a wager. Typically, the special event will provide a higher RTP than the base game. The player may choose to use the awarded plays of the special event immediately, or may choose to participate in another game division, such as returning to a game division in a base game mode or to switch to a division having a different special event in a different state, and later return to the division where the special event play was awarded to use any remaining plays of the special event. In at least some cases, a final outcome for a given game play is determined before a player may switch to a different gameplay division.

In some cases, an EGM can be associated with different wager amounts, which can be discrete amounts or ranges (e.g., level 1 might be from 1-99 credits, level 2 might be 100-499 credits). The different amounts or ranges can be associated with different special events. For example, a special event awarded for "level 1" might only be available for wagers qualifying as "level 1." Special events, including for different levels, can be associated with different gameplay options, game volatility, or both. Similarly, a given special event mode can be associated with different game types, as described above.

In some cases, a player can be granted special event play for multiple wager levels, and play under the different levels may be concurrently available to the player (although, in at least some cases, only a single game division is active at a given time). For example, the player may switch from a level associated with a special event mode to a level that is not currently associated with a special event mode. Or, the player may switch to a different level that is also associated with a special event mode.

In some cases, a player can switch between gameplay divisions (e.g., wager levels), but is not able to select whether to play a base game mode or a special event mode for that level. That is, once a special event mode is active for a given wager level or division, the player must use all special event mode plays before they can return to a base game mode for that division. In other cases, a player can select between playing a base game mode and playing a special event mode, when both are available for a given division.

Allowing a player to switch between different wager levels, including so that they can access a base game mode or a special event mode, or access different game types, can allow players to be more engaged with gameplay on an EGM, and to have more control over their gameplay experience. For example, as special events can provide a change of pace/different gameplay experience, or different RTPs, a player may wish to space out their use of a special event mode, rather than being compelled to use all of their special event mode gameplay immediately, or in a prescribed manner.

In some cases, a particular game mode or game type may have multiple stages. For purposes of this disclosure, the term "stage" refers to a portion of the special features where certain game configurations, such as weights in a lookup table, are set to be substantially the same. As an example, a stage could include multiple spins within the special feature when the spins are set to have the same weights in triggering a low RTP game type, a medium RTP game type, and a high RTP game type.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present disclosure is defined by the appended claims.

I. Example Electronic Gaming Servers and Electronic Gaming Machines

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X that have communication interfaces with the network. The server computers 102 and/or gaming devices 104A-104X can implement one or more aspects of the present disclosure.

The gaming devices 104A-104X may be EGMs such as slot machines, video poker machines, bingo machines, etc. The gaming devices 104A-104X may alternatively be portable and/or remote gaming devices such as, but not limited to, a smartphone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency ("RF") (e.g., wireless fidelity (WiFi®) and Bluetooth®), cable TV, satellite links, and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. In this case, functions normally performed by a server computer or data normally stored on a server computer may instead be performed by or stored on a gaming device. The stand-alone gaming device may be in communication with one or more other gaming devices (but not a server computer). However, it is typical to find multiple EGMs connected to networks implemented with one or more of the different server computers 102 described herein.

A. Example Server Computers

Server computers 102 can include one or more servers that combine to form a casino management system, which manages one or more gaming devices 104A-X. Each of the servers includes at least one processor, memory, and a network interface, which enables communication over one or more networks between the server computers 102 and the gaming devices 104A-X. In general, the casino management system is configured to receive gaming data from the gaming devices 104A-X as the gaming devices 104A-X conduct rounds of play of one or more wagering games.

As shown in FIG. 1, the server computers 102 may include a central determination gaming system server 106 (also called a gaming server), a ticket-in-ticket-out ("TITO") system server 108, a player tracking system server 110, a progressive system server 112, and/or a casino management system server 114. Gaming devices 104A-104X may include features to enable operation of any or all server computers 102 for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

FIG. 1 shows different servers that perform different sets of functions. Alternatively, one or more of the different servers shown in FIG. 1 can be combined.

B. Example Gaming Devices

Still referring to FIG. 1, the gaming devices 104A-C illustrated are specific exemplary embodiments of EGMs, and the same or similar elements shown in gaming devices 104A-C may be included in any gaming device 104X. More generally, an EGM may be any type of gaming machine and may include, without limitation, different structures than those shown in FIG. 1. A gaming device may use specially-configured computer hardware that implements game functionality, or a gaming device may use general-purpose computer hardware that has been programmed to implement game functionality. For example, an EGM can be implemented using a personal computer, tablet computer, smartphone, personal digital assistant, or any other computing device.

Gaming device 104A is often of a cabinet construction which may be aligned in rows or banks of similar devices for placement and operation on a casino floor. The gaming device 104A often includes a main door which provides access to the interior of the cabinet 116. Gaming device 104A typically includes a button area or button deck 120 accessible by a player that is configured with input switches or buttons 122, an access channel for a bill validator 124, and/or an access channel for a ticket-out printer 126. The input switches or buttons 122, along with other input devices, provide at least part of a player interface through which a player controls operation of a game. For example, buttons 122 may be used to start play of a primary game or secondary game. Alternatively, instead of having separate buttons that can be actuated physically, one or more of the buttons 122 can be presented on a touchscreen.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube ("CRT"), or other conventional electronically controlled video monitor. Alternatively, the main display 128 can be a touchscreen display. The main display 128 is an interface component used to play a game on the gaming device 104A.

In some embodiments, the bill validator 124 may also function as a "ticket-in" reader that allows the player to use a casino issued credit ticket to load credits onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, or total amount of winnings on gaming device 104A.

In some embodiments, a player tracking card reader 144, a transceiver (not shown) for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the special event mode. Bonus topper wheel 134 is typically used to play a special event mode, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152, which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116, which may be used to initiate game play. In general, a "handle pull" or "spin" of a game may refer to a single play at a gaming device, whether or not a handle is involved in the play, whether or not a handle is even included in the gaming device, and even if the game does not involve spinning visual elements. Thus, a play can be initiated by a press of a physical or virtual button, or via another activation mechanism.

Figure 2:
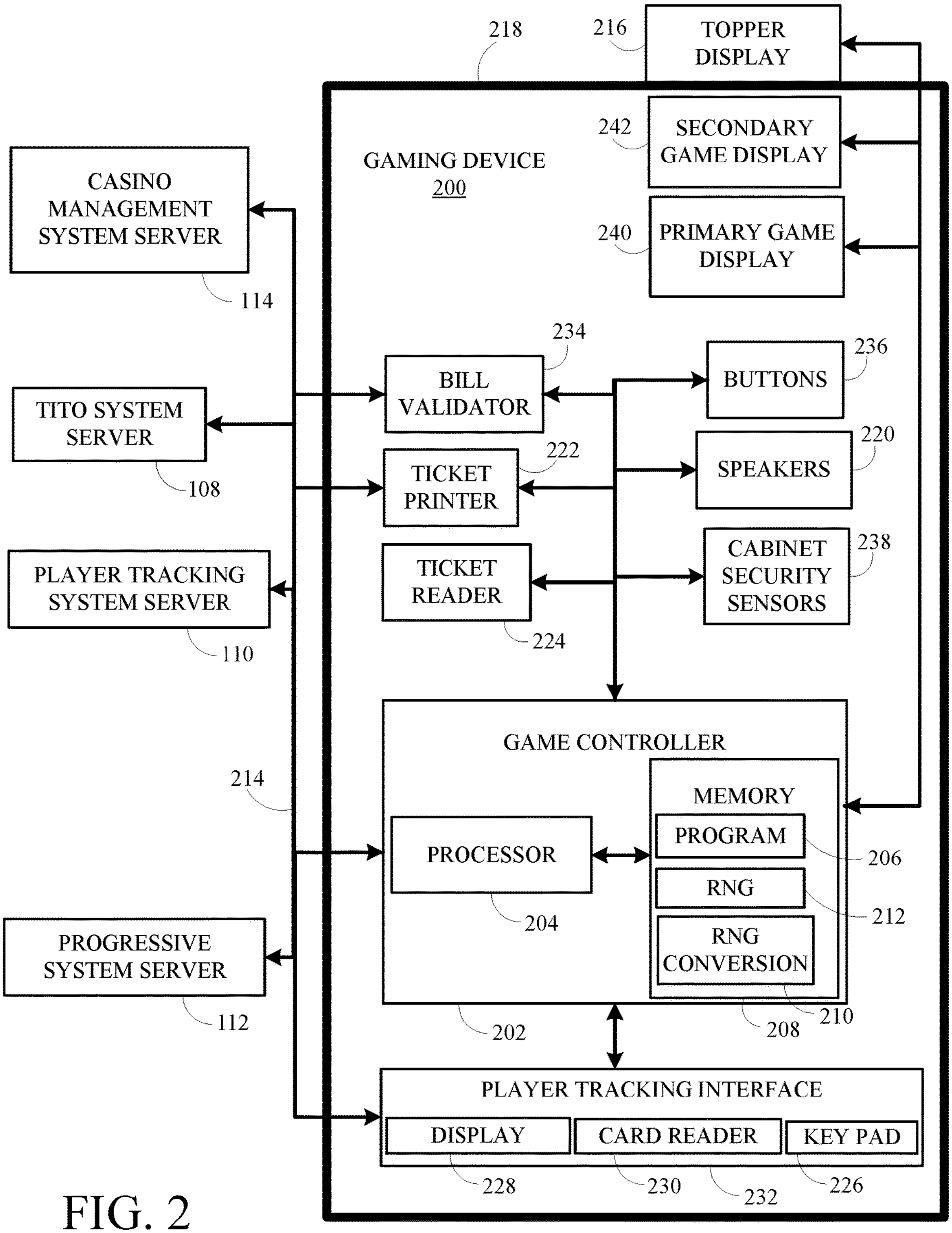
FIG. 2 is a block diagram illustrating an example of a networked EGM according to some embodiments.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. The main display 128 is in a portrait orientation with curvature radius from top to bottom. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Where possible, reference numerals identifying similar features of the embodiments of gaming devices 104A and 104B are used to identify corresponding features of gaming device 104C.

Gaming device 104C does not include physical reels and instead shows game play functions on main display 128A and a secondary display 128B. Gaming device 104C includes a main display 128A that is in a landscape orientation. The main display 128A or secondary display 128B can be a high-resolution LCD, plasma, LED, OLED, or SED panel. Although not illustrated by the front view provided, the landscape display 128A may have a curvature radius from top to bottom, or alternatively from side to side. In some embodiments, display 128A is a flat panel display. Alternatively, the main display 128A can be a touchscreen display. Main display 128A is typically used for primary game play while secondary display 128B is typically used for special event mode play, to show game features or attraction activities while the game is not in play or any other information or media desired by the game designer or operator. The secondary display 128B may be in a landscape orientation with curvature radius from top to bottom, or may be flat. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, special event modes, and may be deployed for operation in Class 2 or Class 3, etc.

C. Example Components of Gaming Device

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1.

As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smartphone enabling player tracking.

FIG. 2 also depicts utilizing a ticket printer 222 to print tickets for a TITO system server 108. Gaming device 200 may further include a bill validator 234, player-input buttons 236 for player input, and cabinet security sensors 238 to detect unauthorized opening of the cabinet 218, each coupled to and operable under the control of game controller 202. The game controller 202 may be a circuit (e.g., an electronic circuit board, a programmable computer chip, etc.) within a gaming device that, in addition to controlling other components, includes one or more processors that process game play instructions in accordance with game play rules, and outputs or generates game play outcomes to one or more displays.

The gaming device 200 includes several display screens, each coupled to and operable under the control of the game controller 202. A primary game display 240 acts as a main display 128, 128A as described with reference to FIG. 1. A secondary game display 242 acts as a secondary display 128B as described with reference to FIG. 1. The gaming device 200 can include a credit display (not shown) that displays a player's current number of credits, cash, account balance, or the equivalent. The gaming device 200 can also include a bet display (not shown) that displays a player's amount wagered. The credit display and/or bet display may be standalone displays, independent of the primary game display 240 and secondary game display 242. Alternatively, the credit display and/or bet display can be incorporated into the primary game display 240 or secondary game display 242. Any of the display screens can be implemented as a touchscreen, with an associated touchscreen controller. In this case, such display screens may be operated as input devices in addition to presenting information, to provide input game play decisions (e.g., actions on and selection of game presentation objects) to the game controller 208.

The games available for play on the gaming device 200 are controlled by a game controller 202. In general, the game controller 202 conducts a wagering game, generates gaming data (e.g., for wagers, game outcomes, payouts, player ratings, duration of play, and time between rounds of play), and, for each round of play of the wagering game, awards any payout or win amount according to a pay table. A base game can include a special event mode (such as a bonus game) that the game controller 202 also conducts.

In some example implementations, the game controller 202 processes game play instructions to perform the following operations. In response to a start condition, the game controller 202 determines whether a special event (or feature) has been activated. A number of special event plays can be determined by the game controller 202 and awarded to the player, or a fixed or determined (such as a predetermined) number of special event mode spins can be awarded to the player. If the player selects to initiate special event play, the game controller 202 can determine a game type for the special event, such as a game type associated with a selected one of a plurality of RTPs, or from among different gameplay scenarios.

The game controller 202 determines an outcome of the process and outputs an indication of the outcome of the process. For example, the game controller 202 determines whether any win conditions exist (on pay lines) and awards win amounts to the player. More generally, the game controller 202 can process game play instructions and generate outcomes as described in Sections II-VI.

The game controller 202 includes one or more processors 204. Processor 204 represents a general-purpose processor, a specialized processor intended to perform certain functional tasks, or a combination thereof. As an example, processor 204 can be a central processing unit ("CPU") that has one or more multi-core processing units and memory mediums (e.g., cache memory) that function as buffers and/or temporary storage for data. Alternatively, processor 204 can be a specialized processor, such as an application specific integrated circuit ("ASIC"), graphics processing unit ("GPU"), field-programmable gate array ("FPGA"), digital signal processor ("DSP"), or another type of hardware accelerator. In another example, processor 204 is a system on chip ("SoC") that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that do retain data upon a loss of power. Examples of memory 208 include random access memory ("RAM"), read-only memory ("ROM"), hard disk drives, solid-state drives, universal serial bus ("USB") flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory ("SRAM"), dynamic random access memory ("DRAM"), magnetic random access memory ("MRAM"), and other such devices. Examples of ROM include a programmable read-only memory ("PROM"), an erasable programmable read-only memory ("EPROM"), an electrically erasable programmable read-only memory ("EEPROM"), or other like memory device. Even though FIG. 2 illustrates that game controller 202 includes a single memory 208, game controller 202 could include multiple memories 208 for storing program instructions and/or data, including memories of different types.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format, such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a UI) to a player. Output for the game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a ROM) or from the central determination gaming system server 106 to memory 208.

When games are implemented in an online environment, at least a portion of the game software can be stored in a remote game server or in a cloud computing service. Game transactions such as adding money to the game (i.e., cash in) and withdrawing money from the game (i.e., cash out) are substituted by implementing electronic fund transfers. A player deposits money into his online gaming account via checks, debit cards, wire and the like. Once funded, the player can move a portion of the cash in his account into the game they want to play. This process is referred to as account-based wagering. Account-based wagering is a convenient monetary transaction system for online and mobile wagering environments since the physical bill acceptor and ticket printer are not available.

In addition to the accounting meters' separation, detection of the location where the wagering transaction takes place is also performed in order to enforce local gaming regulations and properly calculate revenue, profit, and tax withholdings, for example. Thus, a remote gaming device can access a casino via a computer network and participate in a game of chance. The remote gaming device may be a PC, smartphone, or other computing device coupled to the Internet via a wired or wireless link (and, e.g., connecting to a casino management system via a virtual private network). The remote gaming device may be a terminal-based machine, where the actual game (including RNG and outcome determination) is hosted at a gaming server, with the terminal-based machine displaying results of the game via one or more display screens.

The game controller 202 can communicate over a network with one or more other gaming devices or other devices via a communication interface. The communication interface may operate as an input device (e.g., by receiving data from another device) and/or as an output device (e.g., by transmitting data to another device). The gaming device 200 can also include one or more communication ports (not shown) that enable the game controller 202 to communicate with peripheral devices, external video sources, expansion buses, or display screens.

FIG. 2 depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information obtainable by a casino management system.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or selecting various items during a feature game). The player may make these selections using the player-input buttons 236, the primary game display 240 which may be a touchscreen, or using some other device which enables a player to input information into the gaming device 200.

During certain game events, the gaming device 200 may display visual and auditory effects that can be perceived by the player. These effects add to the excitement of a game, which makes a player more likely to continue the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Some embodiments described herein represent improvements in the technical area of EGM software and provide new technology, in that they improve usability of EGMs by enhancing the player's experience, extending player time on the EGMs, and maintaining the interest of current players in the EGMs. In some example implementations, players are provided the ability to shift between gameplay divisions, which can be associated with different game modes, states, or configuration. For example, some divisions may be in a base game mode and others may be in a special event mode. Special events can be associated with stages, such as assigning a player a number of plays in the special event, and RTP, game play, or both, can change as the player uses special event plays.

In further example implementations, an EGM can have one or more reel strips, where at least one of the reel strips includes one or more dynamic symbols. In some cases, a dynamic symbol can be converted to one of a plurality of possible symbols, which can be symbols associated with a base game mode (including symbols that are non-dynamic for other reel strips or reel strip positions) or which are associated with a special event mode. In further cases, a reel strip can have multiple dynamic symbols, which can be populated with base game mode symbols, special event mode symbols, or both.

Dynamic symbols can be associated with different game types, such that the number of special event mode symbols increases for a first game type compared with a second game type. Or, different game types can be associated with at least some different special event mode symbols, such as having a second game type having additional special event symbols available compared with a first game type.

The use of dynamic symbols can facilitate having different game play types for a given EGM, including having different volatility for different game aspects. The dynamic symbols can facilitate a build up to higher award amounts, which may encourage extended play on the gaming device 200. Similarly, the ability to switch between different game play features or wager levels can increase player engagement with an EGM, encouraging longer play. These embodiments are thus not merely new game rules or new display patterns.

Gaming devices such as gaming device 200 (as a generalized example of devices 104A-X) typically include special features and/or additional circuitry that differentiates them from general-purpose computers (e.g., desktop computers and laptops). Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness (e.g., that outcomes will be statistically independent, uniformly distributed over their range, unpredictable, and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness.

To comply, FIG. 2 illustrates that gaming device 200 includes an RNG 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. Gaming regulations may require that each reel outcome be independent of other reel outcomes, such that no reel outcome depends on any other reel outcome.

In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). An EGM can have an overall game RTP. However, different game modes or games types can have RTPs that are different than one another, where the combination of the RTPs for the different game modes and game types provides the overall game RTP. For example, a special event mode may generally have a higher RTP as compared with a base game mode. Certain game types, such as game types for a special event mode, can have different RTPs. For example, game types can include low, medium, and high RTP game types. It should be understood that in the present disclosure having different RTPs for different game types does not indicate that the overall RTP for the EGM changes.

A game can use one or more lookup tables (also called weighted tables) as part of a technical solution that satisfies regulatory requirements for randomness and RTP. In particular, a lookup table can integrate game features (e.g., trigger events for special event modes; newly introduced game elements such as extra reels, new symbols, or new cards; stop positions for dynamic game elements such as spinning reels, spinning wheels, or shifting reels; or card selections from a deck) with random numbers generated by one or more RNGs (or RNG calls), so as to achieve a given level of volatility for a target level of RTP.

In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can set the RNG conversion engine 210 to utilize one or more lookup tables (e.g., weighted tables) to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

As noted, gaming devices 200 are specially-configured computer systems and not merely general-purpose computers. For example, one difference between a gaming device 200 and common processor-based computer system is that gaming device 200 is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem.

In some cases, the gaming device 200 does not advance from a current state to a subsequent state until information that allows the current state to be reconstructed is stored. In the event of a power failure or other malfunction, the gaming device 200 will return to its current state when the power is restored by recovering state information from non-volatile memory. The restored state may include metering information and graphical information that was displayed on the gaming device 200 in the state prior to the malfunction. For instance, if a player was shown an award for a game of chance and, before the award could be provided to the player, the power failed, the gaming device 200, upon the restoration of power, would return to the state where the award is indicated.

More generally, the gaming device 200 records, in non-volatile memory, the values of game parameters assigned during play, such as variables determined by an RNG or internal counters. A game parameter, in general, can be one or more variables whose values govern play at the gaming device and depend on a random selection process. The value of a game parameter can be recorded periodically, in response to some event such as player input, or whenever the value of the game parameter changes. This way, the gaming device 200 can recover its state in case of a power failure or "tilt" event, allowing the gaming device 200 to reconstruct events that have taken place before the power failure or "tilt" event. In contrast, PCs are not state machines to the same extent, and a majority of data is usually lost when a malfunction occurs. This requirement affects the software and hardware design on a gaming device 200. Game history information regarding previous games played, such as an amount wagered, the outcome of the game and so forth, may also be stored in a non-volatile memory device.

In the context of the innovations described herein, for example, when a game controller 202 of a gaming device 200 manages operations to select symbols to be used for a dynamic symbol, or to switch between gameplay divisions, the game controller 202 can save information about state in non-volatile memory at various stages. After starting a process that uses reels on a display screen of the gaming device 200, the game controller 202 can save information in non-volatile memory that indicates a default configuration of the reels, or a determined configuration of the reels. The non-volatile memory can also store other state information, such as a current bet amount, control level (e.g., current bet level), an amount of credits remaining, and/or a win amount for a base game.

Although FIGS. 1 and 2 illustrate specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

Additionally, or alternatively, gaming devices 104A-104X and 200 can include credit transceivers that wirelessly communicate (e.g., Bluetooth or other near-field communication technology) with one or more mobile devices to, perform credit transactions. As an example, bill validator 234 could contain, or be coupled to the credit transceiver that output credits from and/or load credits onto the gaming device 104A by communicating with a player's smartphone (e.g., a digital wallet interface).

Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Embodiments of the present disclosure can be implemented with more or fewer elements than are depicted in FIG. 2. The pictured example embodiments of a gaming device 200, as well as example gaming devices 104A-C, are merely a few examples from a wide range of possible gaming device designs on which embodiments of the present disclosure may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

D. Example Game Processing Architecture

Figure 3:
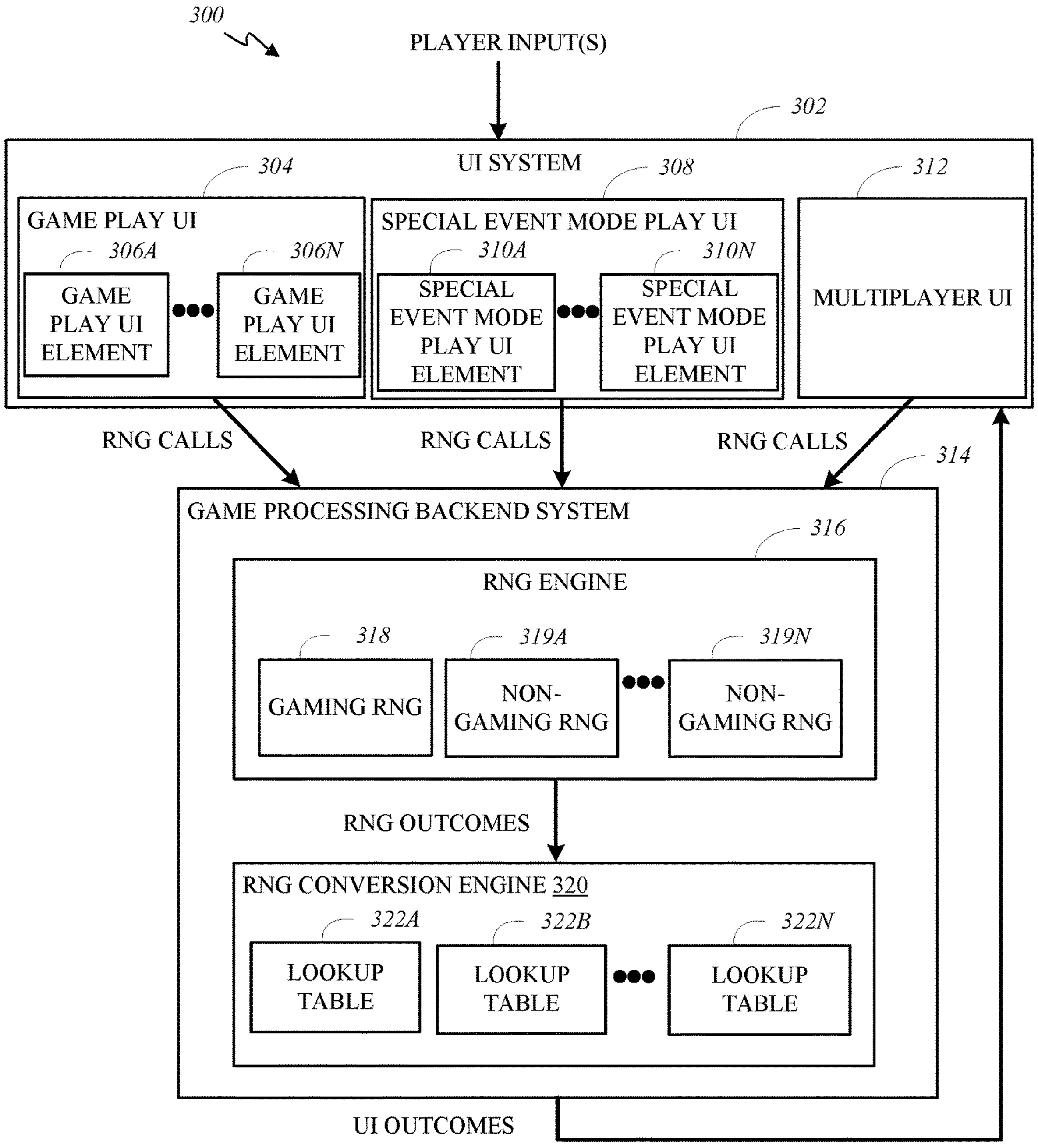
FIG. 3 is a block diagram illustrating an example game processing architecture that implements a game processing pipeline for the play of a game in accordance with some embodiments.

FIG. 3 illustrates, in block diagram form, an example game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314.

Game processing backend system 314 then processes the RNG calls with RNG engine 316 to generate one or more RNG outcomes. The RNG outcomes are then sent to the RNG conversion engine 320 to generate one or more game outcomes, based on the RNG outcomes, for the UI system 302 to use to convey game play (e.g., a display to a player).

The game processing architecture 300 can implement the game processing pipeline using a gaming device, such as one of the gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 can include one or more game play UIs 304, one or more special event mode play UIs 308, and one or more multiplayer UIs 312, where each UI type includes one or more mechanical UIs and/or graphical UIs (GUIs). In other words, the game play UI 304, special event mode play UI 308, and multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and special event mode play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a player. In a subsequent game instance, the UI system 302 could transition out of the base game to one or more special event modes. The special event mode play UI 308 represents a UI that utilizes special event mode play UI elements 310A-310N for a player to interact with and/or view during a special event mode. In one or more embodiments, at least some of the game play UI elements 306A-306N are similar to the special event mode play UI elements 310A-310N. In other embodiments, the game play UI elements 306A-306N can differ from the special event mode play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or present game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome.

To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces ("APIs") to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator ("PRNG") (e.g., Fortuna PRNG) that securely produces random numbers for one or more game features. To generate random numbers, gaming RNG 318 could collect random data from various sources of entropy, such as from an operating system ("OS"). Alternatively, non-gaming RNGs 319A-319N may not be cryptographically secure and/or be computational less expensive. Non-gaming RNGS 319A-319N can thus be used to generate outcomes for non-gaming purposes. As an example, non-gaming RNGs 319A-319N can generate random numbers for purposes such as generating random messages that appear on the gaming device or generating display effects, including generating gameplay display effects that do not affect gameplay outcome (e.g., a speed at which a reel spins).

The RNG conversion engine 320 processes each RNG outcome from RNG engine 316 and converts the RNG outcome to a UI outcome that is fed back to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player.

For example, RNG conversion engine 320 utilizes one or more lookup tables 322A-322N (weighted tables) to regulate a prize payout amount for each RNG outcome and how often the gaming device pays out the derived prize payout amounts. In one example, the RNG conversion engine 320 could utilize one lookup table to map the RNG outcome to a game outcome displayed to a player and utilize a second lookup table as a pay table for determining the prize payout amount for each game outcome. In this example, the mapping from the RNG outcome to the game outcome can affect the level of volatility for the game, (e.g., by regulating the frequency of occurrence of a game feature such as hitting certain prize payout amounts, triggering a special event mode, winning a progressive jackpot, etc.).

Different lookup tables could be utilized depending on the different game modes, for example, a base game versus a special event mode (such as a bonus game). In the context of the innovations described herein, for example, one or more lookup tables can be used to determine which symbols should be displayed for one or more dynamic symbols used with gameplay elements, such as reels.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a special event mode, the UI system could update one or more special event mode play UI elements 310A-310N (e.g., symbols) for the special event mode play UI 308. In response to the updating the appropriate UI, the player may subsequently provide additional player inputs to initiate a subsequent game instance that progresses through the game processing pipeline.

In general, the example game processing architecture 300 shown in FIG. 3 can be used to process game play instructions and generate outcomes as described in Sections II-VI. For example, in some example implementations, the example game processing architecture 300 implements a game processing pipeline for a process (e.g., mode of a base reel game or bonus reel game) that includes determining a game type (such as a low RTP, medium RTP, or high RTP game type).

In response to a start condition, the game play UI 304 (or special event mode play UI 308) makes one or more RNG calls to the game processing backend system 314. In response, the backend system 314 performs various operations. Using a gaming RNG 318, the RNG engine 316 generates one or more random numbers, which are passed to the RNG conversion engine 320. The RNG conversion engine 320, using one or more of the random number(s) and one or more of the lookup tables 322A . . . 322N, determine a game type, such as game type having a particular RTP, that will be used for current game play. The lookup tables 322A . . . 322N can be configured so that the combination of odds of base game mode being selected (with a base game RTP), the odds of a special event mode being triggered (having an overall special event mode RTP), and the odds of individual game types with different RTPs being selected (which together provide the overall special event mode RTP) produce an overall RTP for the EGM.

In some cases, different lookup tables 322 can be used for different game play stages. For example, a later game play stage, such as when a player has relatively fewer special event plays remaining, can be associated with a lookup table 322 that provides greater odds for a higher RTP configuration being selected. In some cases, certain game play stages or configurations, such as a high RTP stage, may only be available under particular conditions, such as a player having a threshold number of plays remaining, including a current play being a last available play in a special event, or special event stage (e.g., the last spin in a special event mode).

Lookup tables 322 can also be used to select the symbols that will be used for dynamic symbols for a particular game instance, such as a number of dynamic symbols that will display a different symbol compared with a symbol displayed in another game mode, such as a base game mode, or which are different than symbols that are non-dynamic for particular reel strip positions.

Lookup tables 322 can be used for additional purposes, such as to determine when a special event mode will be triggered. Special event mode triggers can be associated with play on a base game, play during a special event mode, play immediately after the special event mode ends, or both. In some cases, special event mode triggers can be made available upon satisfaction of other conditions, such as a special event mode being in a particular stage. These conditions can also be reflected in the lookup tables 322, including the selection of a particular lookup table.

Using the gaming RNG 318, the RNG engine 316 determines more random numbers, which the RNG conversion engine 320 uses (along with one or more of the lookup tables 322A . . . 322N) to determine symbol stop positions for the respective reels of the active reels. The backend system 314 can also determine the outcome of the process (e.g., calculating whether any win conditions exist on pay lines).

The backend system 314 returns the generated results to the game play UI 304 (or special event mode play UI 308), which causes the appropriate symbols to be displayed (e.g., determines the symbols to be displayed for any dynamic symbols) and spins at least some of the active reels before stopping at the active reels. The generated results returned by the backend system 314 can include game-related outcomes (such as the symbols to be used for dynamic reel symbols and symbol stop positions for the respective reels) as well as game animation effects not related to game outcomes. For example, the backend system 314 can return results of a single RNG call, for which a single RNG is mapped using a lookup table that defines some game-related outcomes (such as symbols used for dynamic symbols, reel stop positions and associated game results) as well as animation effects (e.g., how the reels are shown to spin, a spinning speed, an order in which reels are stopped, game scenario related animations, etc.).

Alternatively, the game play UI 304 (or special event mode play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or special event mode play UI 308) can perform display operations consistent with the determined animation effects returned from the backend system 314.

Eventually, the game play UI 304 (or special event mode play UI 308) stops the spinning of the reels at the symbol stop positions returned for the respective reels. Finally, the game play UI 304 (or special event mode play UI 308) outputs an indication of the outcome of the process.

In a specific example, a player can initiate gameplay through the game play UI 304. The game play UI 304 can make one or more RNG calls to the backend system 314 to determine a game outcome, such as for a base game. Using the gaming RNG 318 and one or more lookup tables of the lookup tables 322A . . . 322N, reel stop positions can be determined, which can be translated into a game outcome that is returned to the UI system 302 to be displayed to the player.

The game play UI 304 can also make an RNG call to the backend system 314 to determine whether a special event mode is to be triggered. Using the gaming RNG 318 and one or more lookup tables of the lookup tables 322A . . . 322N, it is determined whether the special event mode is triggered. The result can be sent to the UI system 302 to be displayed to the player.

If the special event mode is triggered, the player can be awarded a number of plays in the special event mode. The special event mode can be displayed and interacted with using the gameplay UI 304 or the special event mode UI 308. In a specific example, plays in the special event mode require a wager by the player. For example, if the outcome of the base game was a win, credits can be awarded to the player before play of the special event mode. If the outcome of the special event mode was not a win, credit for the play is deducted from the player's account, additional credits are not awarded, and a new play of the EGM will be of the special event mode, and requires a new wager.

When the player initiates play in the special event mode, the UI system 302 makes an RNG call to the backend system 314 to determine a game type, such as whether the game will be associated with a low RTP game type, a medium RTP game type, or a high RTP game type. The results of the RNG call can be used by the RNG conversion engine 320 and one or more lookup tables of the lookup tables 322A . . . 322N to determine the game type. The determined game type or configuration can be used to determine one or more of the lookup tables 322A . . . 322N that will be used to determine an outcome of a given instance of the special event mode. FIGS. 8A and 8B illustrate example lookup tables that can be used to determine a game type for a game instance to be carried out in a special event mode, including based on a number of spins remaining in a special event mode.

The game type and reel strip information can be sent to the UI system 302. The game type can be used to determine what reel strip(s) to display for the game, or particular reel symbols to be displayed. For instance, if a reel strip includes a dynamic symbol, the symbol displayed at that position can be a symbol designated for a high RTP game if a high RTP game type was determined from the result of the RNG call, or a symbol designated for a low RTP game type can be displayed if a low RTP game type was determined from the result of the RNG call.

The UI system 302 can make one or more RNG calls to the backend system 314 to determine a game outcome for a game instance in the special event mode. The RNG engine 316 provides random numbers, such as from the gaming RNG 318, that are used to determine reel stop positions using the RNG conversion engine 320 and the one or more lookup tables of the lookup tables 322A . . . 322N (such as the lookup tables of FIGS. 8A and 8B) indicated by the game type or configuration that was determined to be active for the current game play.

In some cases, a lookup table of the lookup tables 322A . . . 322N (or of FIGS. 8A and 8B) can include values that are associated with different game types. In a specific example, a number of remaining plays in a special event mode is used in determining a game type. That is, for example, the odds of a high RTP game type occurring can increase as the number of remaining special event spins decreases.

II. Examples of Game Play Dynamics with Dynamic Symbols

This section describes various innovations in user interface ("UI") features of electronic gaming machines ("EGMs"), as well as innovations in features of backend processing for EGMs to implement the UI features. Some of the innovations relate to the use of dynamic symbols in an EGM. In particular, the innovations relate to the use of dynamic symbols in one or more reel strips of a reel-based EGM. At least one reel strip includes a dynamic symbol. The reel may have other dynamic symbols, and can have at least one reel strip position that is associated with a non-dynamic symbol. In some cases, all of the reel strip positions can be dynamic symbols.

A given dynamic symbol is associated with a plurality of possible symbols that can be displayed at the appropriate reel strip position during game play. At least one of the possible symbols is a symbol associated with a special event mode, and is different than the symbol displayed for that dynamic symbol when the EGM is in a base game mode. The different symbol can be another symbol from a symbol set (or a subset thereof) associated with the base game, or can be a symbol associated with a symbol set for a special event mode.

Compared to the symbols of the reels during the base game, symbols that can be displayed for the dynamic symbols typically include symbols of greater interest to a player, due to their enhanced value when calculating win conditions on pay lines (e.g., wild symbols, multiplier symbols, special character symbols). As such, changing symbols displayed for a given dynamic symbol, such as in response to a transition from a base game mode to a special event mode (or between game types in a special event mode), can increase game volatility (e.g., provide more game options, which can increase player use of the EGM) while maintaining an overall level of RTP. Further, the use of dynamic symbols can allow for different RTPs to be used with a single set of reel strips, which can facilitate game design (e.g., setting lookup tables, RTP), including changing RTP for different game types of a special event mode.

A. Introduction and Example Hardware

Depending on implementation, various form factors of EGMs can incorporate these innovations. For example, for a "thick client" implementation, an EGM (such as a gaming device 104A-X in FIG. 1 or gaming device 200 in FIG. 2) stores computer-executable instructions for controlling one or more wagering games in local memory of the EGM and executes those instructions in one or more local processors of the EGM. The computer-executable instructions for controlling the game(s) may be stored within the EGM (e.g., at a factory) prior to installation of the EGM at a gaming establishment. Or, the computer-executable instructions for controlling the game(s) may be stored within the EGM after installation of the EGM at a gaming establishment (e.g., by downloading the instructions to the EGM over a network, or by installing memory that stores the instructions into the EGM, then configuring the EGM). In such a "thick client" implementation, a game controller of the EGM conducts one of the wagering game(s) and manages various interfaces of the EGM to receive player inputs and commands.

Or, as another example, for a "thin client" implementation, computer-executable instructions for controlling one or more wagering games are stored in memory of a gaming server (e.g., central determination gaming system server or other remote host) and executed in one or more processors of the gaming server. The game server remotely controls one of the wagering game(s) over a network, and the EGM displays screens for the wagering game and manages interfaces to receive player inputs and commands.

The wagering games can include base games as well as special event modes (such as a bonus game). A "base" or "primary" game may, for example, include play that involves spinning reels. A "bonus" or "secondary" game/feature can add the possibility of winning a relatively large payout. A special event mode may require an additional wager, but typically does not. In specific examples, the bonus game requires an additional wager. In more particular examples, the bonus games require an additional wager of a particular amount, such as an amount previously wagered in the bonus game or a base game from which the bonus game was triggered, or an amount within a range associated with such a prior wager. A single play of a game can constitute a single complete game or wager (e.g., a single spin of the reels or a series of spins which culminate in a final aggregate outcome).

In some example implementations, the EGM or gaming server can conduct a base reel game (for regular play or free spins), a bonus reel game, and a gateway wheel game. The base reel game and bonus reel game use spinning reels and a reel area on a display screen. As in a typical reel game, the reels of the base reel game or bonus reel game "spin" graphically through the reel area on the display screen when a player actuates a "spin" or "play" button, which acts as a "handle pull" event. A game controller randomly selects positions in the respective reels, and the respective reels stop at the selected positions, with some number of symbols visible in the reel area for each of the reels. For example, for a given reel, the game controller generates a random number and determines a position on the reel strip of the reel using the random number (e.g., with a weighted table). The game controller generates different random numbers for the respective reels that are spun. In this way, the game controller determines which symbols of the respective reels are visible in the reel area on the display screen.

In general, a display screen (or simply "display" or "screen") is an area that conveys information to a viewer. The information may be dynamic, in which case, the display screen may use LCD technology, LED technology, CRT technology, or some other display technology. A main display screen (also called a primary game screen or main display) can be a display screen or an area of a display screen used to display game information related to a base game, such as a video representation of one or more spinning reels. A secondary display screen (also called a secondary game screen or bonus display) can be a display screen or an area of a display screen used to display secondary game information, such as animations and other graphics associated with a bonus game.

A base reel game or bonus reel game may award special event play to a player. A special event may enhance an EGM and the experience of players by adding elements of excitement and chance, and may be associated with a higher RTP. The special event can utilize a different set of reels, display screens, controls, symbols, etc. than the base reel game or bonus reel game in normal operation. Alternatively, the special event can reuse or reconfigure at least some of the reels, display screens, symbols, etc. of a base reel game or bonus reel game. The special event for a base reel game or bonus reel game can be started in response to satisfaction of a start condition. For example, the special event can be randomly triggered. Alternatively, the special event can be triggered in some other way (e.g., a combination of symbols in a previous play).

B. Example Reel Area and Reels with Dynamic Symbols

Figure 4:
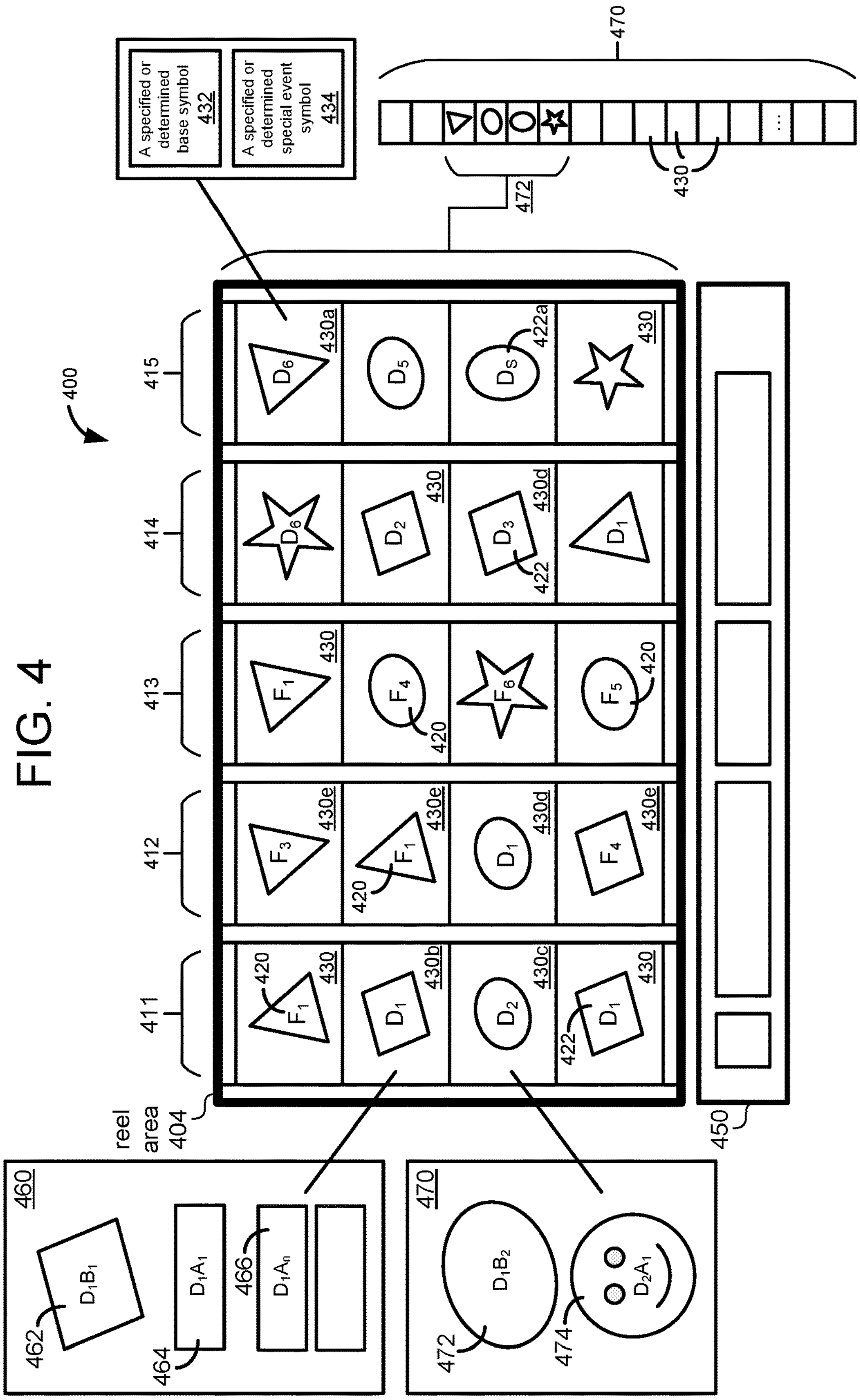
FIG. 4 is a representation of an example display screen of an EGM that uses dynamic symbols in a reel game, according to some example implementations.

FIG. 4 is a diagram that represents an example display screen 400 of an electronic gaming device, such as an EGM, for a base reel game or a special event mode reel game, according to some example implementations. The example screen 400 may be rendered on a main display screen, secondary display screen, or other display screen of an electronic gaming device such as an EGM. The display screen 400 includes a reel area 404 and a supplemental information area 450.

The reel area 404 (shown with a heavy line in FIG. 4) encloses viewable portions of reels. In FIG. 4, the reel area 404 encloses viewable portions of five reels 411, 412, 413, 414, 415. For each of the five reels, the viewable portion of the reel includes four symbol positions, which span the reel area 404. The symbols include special symbols (e.g., wild symbols) and other symbols. The symbols on the reels can be static or animated. Thus, the reel area 404 is a matrix of symbols on the display screen, and may be highlighted graphically to emphasize reels and symbols within the reel area 404.

FIG. 4 illustrates a reel strip 470 for reel 415. The portion 472 of the reel strip 470 in the reel area 404 can represent a display position of reel strip 470, which (along with one or more pay lines, and symbols for other reels 411-414) can indicate a game outcome. Or, the portion 472 of the reel strip 470 in the reel area 404 can represent a "snapshot" of the reel strip as the reel strip is simulated to spin prior to a game outcome being shown. Although an example reel strip 470 is only shown for reel 415, it should be appreciated that each reel 411-414 will be associated with a similar reel strip, although the number of stops on a reel strip and the symbols used on a reel strip can vary between the reel strips.

The reel strip 470 shows additional reel positions 430 of the x reel positions beyond those shown in the reel area 404. The reel positions 430 can be associated with dynamic symbol positions 430*d*, can be non-dynamic reel positions 430*e*, or can be a combination thereof.

The number of reels and dimensions of the reel area 404 depend on implementation. In general, the reel area 404 has an m×n configuration, with m reels and with n symbols visible per reel. The n symbols are typically a proper subset of o symbols that are available to be displayed for a given reel. Each reel can be associated with a number of possible reel positions, p, where p is greater than or equal to n.

Alternatively, the reel area 404 can have another configuration. For example, the reel area 404 can have different numbers of symbols visible for different reels (e.g., going left to right in the reel area 404, two symbols visible for a leftmost reel, three symbols visible for a second reel, four symbols visible for a center reel, three symbols visible for a fourth reel, and two symbols visible for a rightmost reel). The reel area for a base reel game and reel area for a bonus reel game can be the same or different.

The supplemental information area 450 presents information such as a current bet amount, a current bet level (e.g., 1×, 2×, 3×, 4×, 5×), a count of pay lines that are monitored, an amount of credits remaining, and/or a win amount for a round of play. As explained in Sections V and VI, below, the supplemental information area 450 can include a graphic (e.g., image, animation) that provides information for different games or gaming states that are available to a player, such as for different wager amounts or levels (e.g., a range of wager, such as 1-99, 100-199, 200-499, or 500-999 credits). The player, in some cases, may be allowed to switch between gaming states, including by selecting user interface controls (e.g., icons that can be activated via a touchscreen, or physical buttons that correspond to options shown in the supplemental information area 450) for a desired gaming state.

The reels 411-415 can include one or more non-dynamic symbols 420, one or more symbols 422 that update dynamic symbols, or a combination thereof. Symbols 422 represents an updated symbol for dynamic symbols at dynamic symbol positions 430*d*. Non-dynamic symbols 420 can be displayed at non-dynamic symbol positions 430*e*. A non-dynamic symbol position 430*e* refers to a position on the reel strip (e.g., reel strip 470) that is associated with a static symbol whenever that reel strip is used. The dynamic symbol positions 430*d* refers to a position on the reel strip (e.g., reel strip 470) that is associated with a dynamic symbol.

In some cases, a symbol 422 that updates a dynamic symbol can be selected from multiple possible symbols 422, where the symbol 422 selected to be displayed for the dynamic symbol can depend on factors such as a game mode (e.g., base game versus special event mode) or a game type, or other factors, including randomly determining what symbol should be displayed for a given dynamic symbol from a set of possible symbols.

Different reels 411-415 can include the same symbols or different symbols. If two reels have the same symbols, the symbols can appear at the same reel positions 430 (or stops), or at different reel positions. Some reels 411-415 can include only non-dynamic symbol positions 430*e* or only dynamic symbol positions 430*d*.

For each of the reel(s) 411-415, a reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list, queue, stack) that tracks the symbols at the respective positions of the reel strip for the reel.

In some example implementations, the configuration of the symbols at the positions of the reel strips for the reel(s) of a base reel game is fixed after a game instance of the base reel game is initialized, although limited reconfiguration operations may be permitted. In other example implementations, the configuration of the symbols at the positions of the reel strips for the reel(s) of a base reel game can change dynamically after the instance of the base reel game is initialized (e.g., depending on bet level or some other factor). Dynamic symbols can be used to implement such configuration changes.

The configuration of symbols at positions of reel strips for reel(s) of a bonus reel game (e.g., a type of special feature) can change for each instance of the bonus reel game, or even within a bonus reel game. The count of symbol positions can be the same for each of the reels within a base reel game (or bonus reel game) or different for different main reels, and the count of symbol positions per reel may be different between a base reel game and bonus reel game.

A symbol set for the reel(s) can include various symbol types. In some example implementations, the symbol set for the reel(s) includes a jackpot symbol type, a wild symbol type, some number of picture symbol types, some number of minor/low symbol types, and a scatter symbol type (which triggers bonuses). Alternatively, the symbol set for the reel(s) can include other and/or additional symbols.

With reference to reel 411, a reel, generally, includes a plurality of positions or stops 430. When a game is being designed, a given position 430 can be designated as being associated with a non-dynamic symbol 420 or a dynamic symbol position 430*d*, which will be updated with a symbol 422. As illustrated for dynamic symbol position 430*a* of reel 415, symbols (e.g., symbol 422*a* for dynamic symbol position 430*a*) that will update a dynamic symbol position 430*d* can be associated with a specified or determined base symbol 432 or with a specified or determined special event symbol 434.

Specified symbols, whether base symbols 432 (e.g., for a base game) or special event symbols 434 (e., for a bonus game), can be specified for a particular game type. For example, it can be specified that a symbol 422 used for a particular dynamic symbol position 430*d* will always be the same symbol when the game is in a base game mode or a special event mode (including based on a game type for the special event). A game outcome can be determined at least in part on whether, for example, the specific symbol 422 that is used for a dynamic symbol position 430*d* will be visible on a screen that displays a game outcome, or whether a pay line or outcome indicator indicates the symbol.

Similarly, the symbol used for a dynamic symbol position 430*d* can be specified differently for a special event mode (or a game type within a special event mode) than for a base game mode, when the base game mode and the special event mode use the same set of reel strips (but with different symbols displayed for at least one dynamic symbol). During game play of the base game mode, a dynamic symbol position 430*d* can display a symbol 422 that is a base game symbol. When a special event mode is triggered, the dynamic symbol position 430*d* can be updated with the symbol 422 configured for that dynamic symbol during the special event mode. In another example, the symbol 422 at dynamic symbol position 430*d* during a first game type (which can be associated with a special event mode) can be a symbol from a base game mode, and can be the same symbol as when the reel strip is used in the base game mode. During a second game type (which can also be for the special event mode), a symbol 422 associated with the special event mode can be displayed.

In specific implementations, a game can have a set of base game symbols and a set of special feature symbols. At least a portion of the special feature symbols can be different than symbols in the base game symbol set. A dynamic symbol position 430*d* can be updated with a symbol from the base game symbol set during a base game. During a special event, the dynamic symbol position 430*d* can display a different symbol. Changing to a different symbol can include changing to a different symbol of the base game symbol set or to a symbol of the special feature symbol set. Having dynamic symbol positions 430*d* that can display different symbols 422 for different game play modes can allow for greater flexibility in game play design, including both in designing game play experiences for a player and in configuring a game to achieve a desired RTP and/or volatility.

In another example, a special event mode may have different game types. For example, a particular game instance of a special event mode might have a low RTP game type or a high RTP game type. Whether a low or high RTP game type is active can be determined during game play, such as by an RNG call that determines a game outcome or by a separate RNG call before a game outcome is determined. Whether a low or high RTP game type is selected for the game play instance can determine what symbol 422 is displayed for a particular dynamic symbol position 430*d*.

The use of dynamic symbol positions 430*d* and dynamic symbols can thus provide flexibility in game play and game configuration (e.g., RTP). During a first game type, most or all of the dynamic symbol positions 430*d* can display symbols associated with a base game. When a second game type is triggered, at least some of the dynamic symbol positions 430*d* can display special event mode symbols (e.g., symbol 422), or can display different base game mode symbols. The special event mode symbols or different base game symbols can vary RTP from one game instance to another game instance, such that the altered symbols increase chance of achieving a particularly desirable outcome (e.g., a jackpot). For instance, a high RTP game type may be associated with a higher density of special event symbols than a low RTP game type.

Dynamic symbol positions 430*b*, 430*c* of reel 411 illustrate how different symbols 422 can be selected for a dynamic symbol 430*d*. Dynamic symbol position 430*b* has a dynamic symbol that is associated with a symbol set or collection 460. The symbol set 460 includes a base game mode symbol 462 and two possible special event mode, or alternate, symbols 464, 466. When an EGM is in a base game mode, base game symbol 462 can be displayed for dynamic symbol position 430*b*. When the EGM is in a special event mode, either symbol 464 or 466 can be displayed. In some cases, whether symbol 464 or 466 is displayed can depend on a game type, such as a first game type using symbol 464 and a second game type using symbol 466.

While dynamic symbol position 430*b* was associated with multiple special event symbols 464, 466, dynamic symbol position 430*c* is associated with a symbol set 470 that includes a single base game symbol 472 and a single special event symbol 474.

In various implementations, symbols sets for dynamic symbols can be the same for the reels 411-415, while in others at least some of the symbol sets can be different. For example, dynamic symbol 422*a* can represent a dynamic symbol (such as for a special event) that only appears on reel 415 (e.g., for one or more dynamic symbol positions 430*d* on reel 415).

Figure 5:
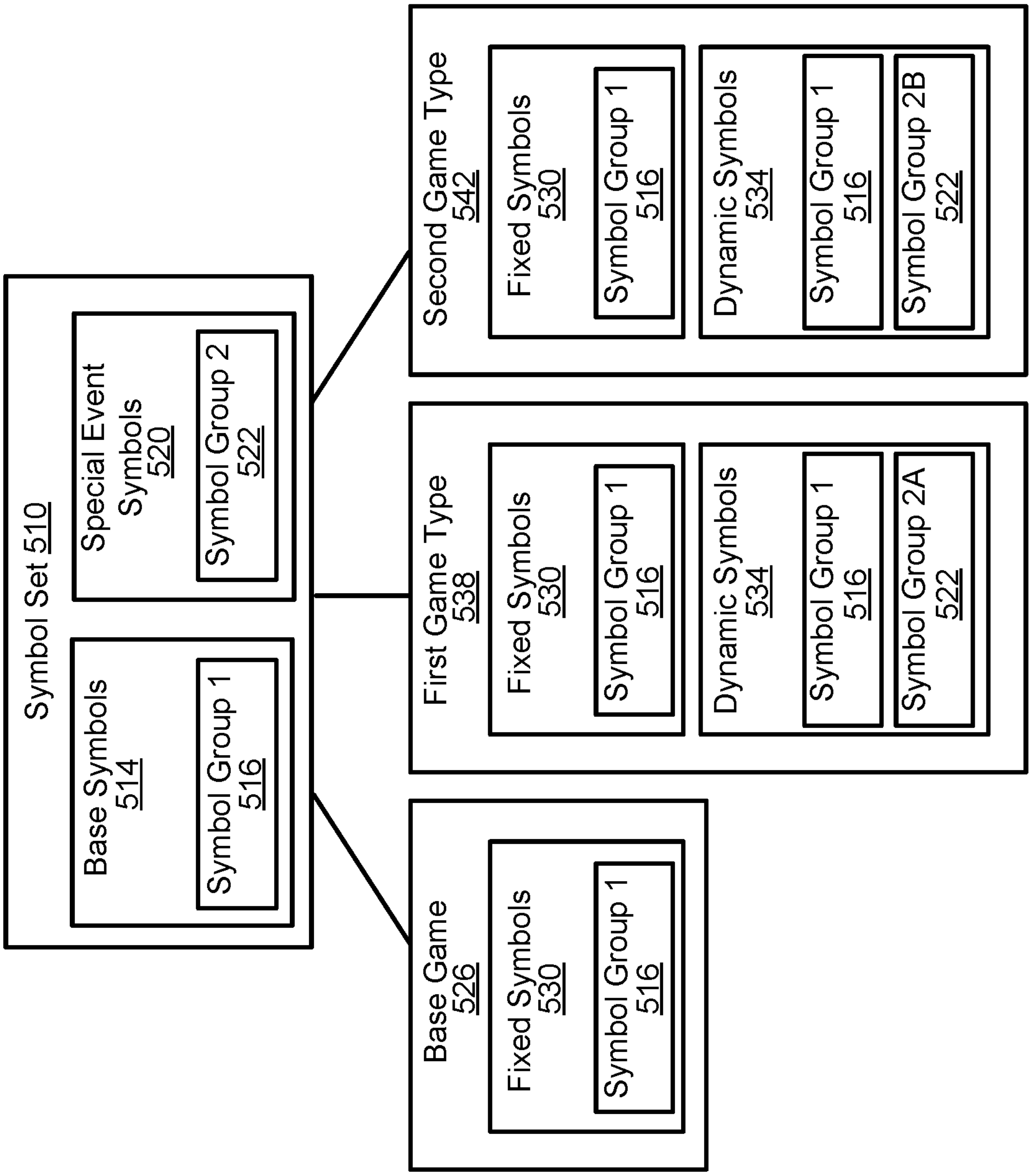
FIG. 5 is a diagram illustrating symbol sets that can be included in an EGM that uses dynamic symbols, and how different symbol sets, or subsets, can be used with different game modes or configurations.

FIG. 5 illustrates how an EGM can be associated with various symbol sets, and how particular symbols can be selected from such sets to update dynamic symbols, including based on a game type. A game for an EGM can be associated with a symbol set 510. The symbol set 510 can include a subset 514 that includes symbols in a symbol group 516, symbol group 1, representing base symbols (e.g., symbols associated with a base game). The symbol set 510 can include a subset 520 that includes symbols in a symbol group 522, symbol group 2, representing symbols for one or more special events.

As shown in FIG. 5, a base game 526 can include one or more reel strips, each having a plurality of positions, where the number of positions for the reel strips can be the same or different. The reel strips are associated with non-dynamic symbols 530, which can be selected from the symbol group 516. Note that while some of the symbols in the symbol group 516 may be used in a special event, they can be considered as part of the symbol group 516, associated with a base game, as long as they are displayed during play of the base game.

In one or more other implementations, some or all of the reel positions in the base game 526 may include dynamic symbols (not shown in FIG. 5). As an example, the dynamic symbols for base game reel strips could be selected from symbols from a symbol group (e.g., symbol group 516). That is, all symbols displayed in the base game are from the base game symbol group 516, regardless of whether they are non-dynamic symbols 530 or dynamic symbols 534.

A game can be associated with a first game type 538, which can be a game type of a special event mode. The first game type 538 can use a different set of reel strips than the base game mode 526. Reel strips can include non-dynamic symbols 530 from the base game 526. However, symbols displayed for some or all of dynamic symbols 534 for the first game type 538 reel strips may change, and can be selected from the symbol group 516 or from the symbol group 522, shown as symbol group 2A, where symbol group 2A is a subset of symbol group 2. Thus, it can be seen that the use of dynamic symbols can facilitate transitioning between the base game 526 and the first game type 538.

As described above, in some aspects, for a given reel position, a change to a dynamic symbol 534 between the base game 526 and the first game type 538 can involve displaying a different base game symbol, from group 516. For example, the first game type 538 can be associated with a higher RTP than for the base game 526. Increasing the RTP can be accomplished by increasing the odds for achieving a particular outcome of the base game by changing a symbol from the symbol group 516 between the base game 526 and the first game type 538. Or, increasing the RTP can be accomplished by introducing new game play outcomes (e.g., winning symbols or symbol combinations) using a symbol from the symbol set 522. It should be appreciated, however, that it is not necessary for the RTP to increase between the base game 526 and the first game type 538.

A game can be associated with a second game type 542, which can be associated with a special event mode. As with the first game type 538, the reel strips for the second game type 542 can include non-dynamic symbols 530, which can correspond to symbols for the reel strips associated with the base game 526. At least a portion of the symbols used to convert dynamic symbols 534 in the second game type 542 are selected to be different than those used for the first game type 538. As shown, the symbols that update the dynamic symbols 534 can be selected from Symbol Group 2B, which is also selected from the symbol group 522, but Symbol Group 2B is at least partially different than Symbol Group 2A (such as by including at least one additional member or at least one different member). For example, at least one dynamic symbol 534 that displayed a symbol from the symbol set 516 in the first game type 538 can display a symbol from the symbol set 522 in the second game type 542. Transitioning to the second game type 542 can enhance a player's experience, as a larger number of special-event related symbols can be displayed.

In other cases, a dynamic symbol 534 from the first game type 538 can display a first symbol from the set 522, but can display a second, different, symbol from the set 522 during the second game type 542. Displaying a different symbol from the set 522 can provide a larger variety of game play options or options for configuring a desired RTP.

Figure 6A:
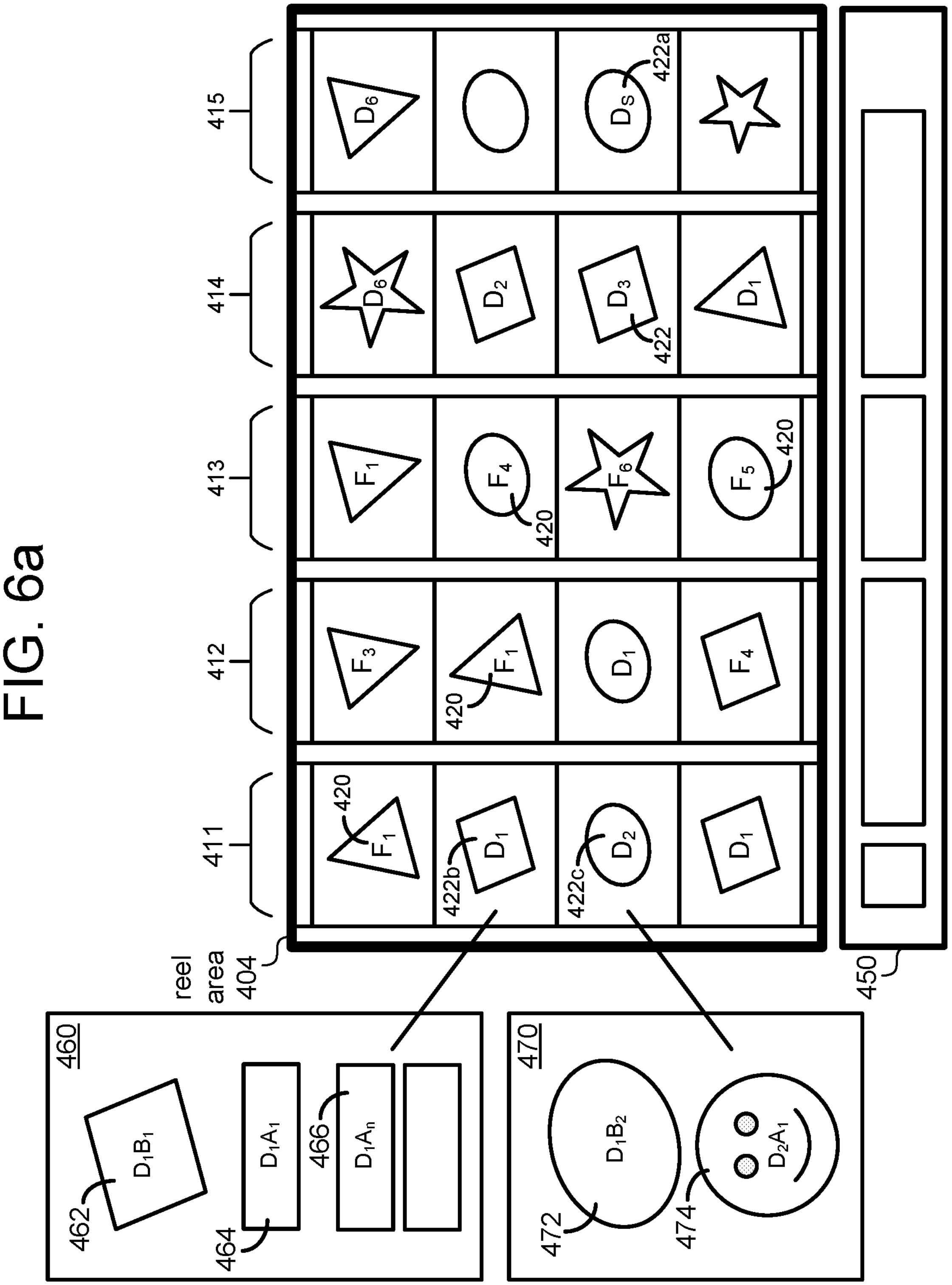
FIGS. 6*a*-6*d* are representations of an example display screen of an EGM that uses dynamic symbols in a reel game as gameplay progresses between different game modes and configurations, according to some example implementations.

C. Example Selection of Symbols to be Displayed for Dynamic Symbols During Game Play FIGS. 6*a*-6*d* illustrate how symbols displayed for dynamic symbols can change throughout the course of gameplay. FIGS. 6*a*-6*d* are at least generally similar to FIG. 4, showing a reel area 404 with five reels 411-415. FIG. 6*a* shows the reels 411-415 in a first game type, which may be associated with a special event mode. Recall, with reference to FIG. 4, the reel area 404 displays only a portion of the total number of symbols associated with reels 411-415. The reels 411-415 include the non-dynamic symbols 420 at non-dynamic symbol positions, which display symbols associated with a base game. The reels 411-415 also include the dynamic symbols that have been converted to be displayed as base game symbols 422.

To illustrate particular aspects of the present disclosure, consider symbols 422*b*, 422*c*, as symbols used to update dynamic symbols that are part of reel 411. Using FIG. 6*a* as an example, symbol 422*b* can be selected from the symbol set 460. Symbol 422*c* can be selected from the symbol set 470. Note that the base game symbols 462, 472 are different than one another. Similarly, the special event symbol 474 is different than the special event symbols 464, 466. In other cases, multiple dynamic symbols can have the same base game or special event mode symbols available, or assigned (e.g., base game symbol 462 and/or special event mode symbol 464 could be included in symbol set 470 in addition to symbol set 460).

All of the symbols 422 displayed represent dynamic symbols that have been converted to symbols from a symbol set for the base game mode. For example, the symbol 422*b* is the base game symbol 462 and the symbol 422*c* is the base game symbol 472.

Figure 6B:
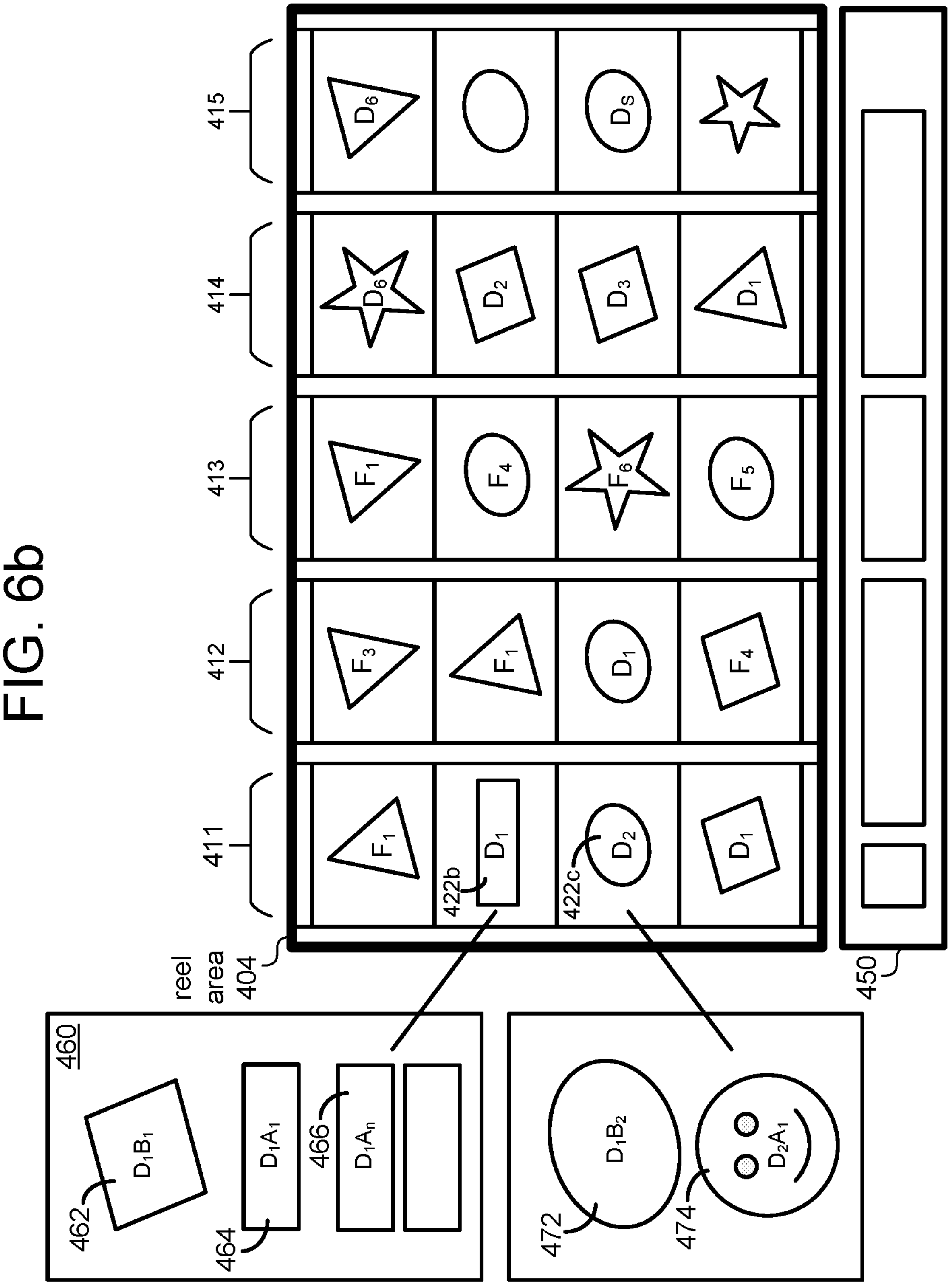

FIG. 6*b* illustrates the reel area 404 during a second game type, which can also be associated with a special event mode. At least a portion of the symbols 422 displayed on the reel for the dynamic symbols (not just displayed in the display area) are different compared with the first game type of FIG. 6*a*. For example, symbol 422*b* is now the special event symbol 464. However, other symbols 422, such as symbol 422*c*, displayed for dynamic symbols are still symbols from the base game mode (e.g., the base game mode symbol 472).

Figure 6C:
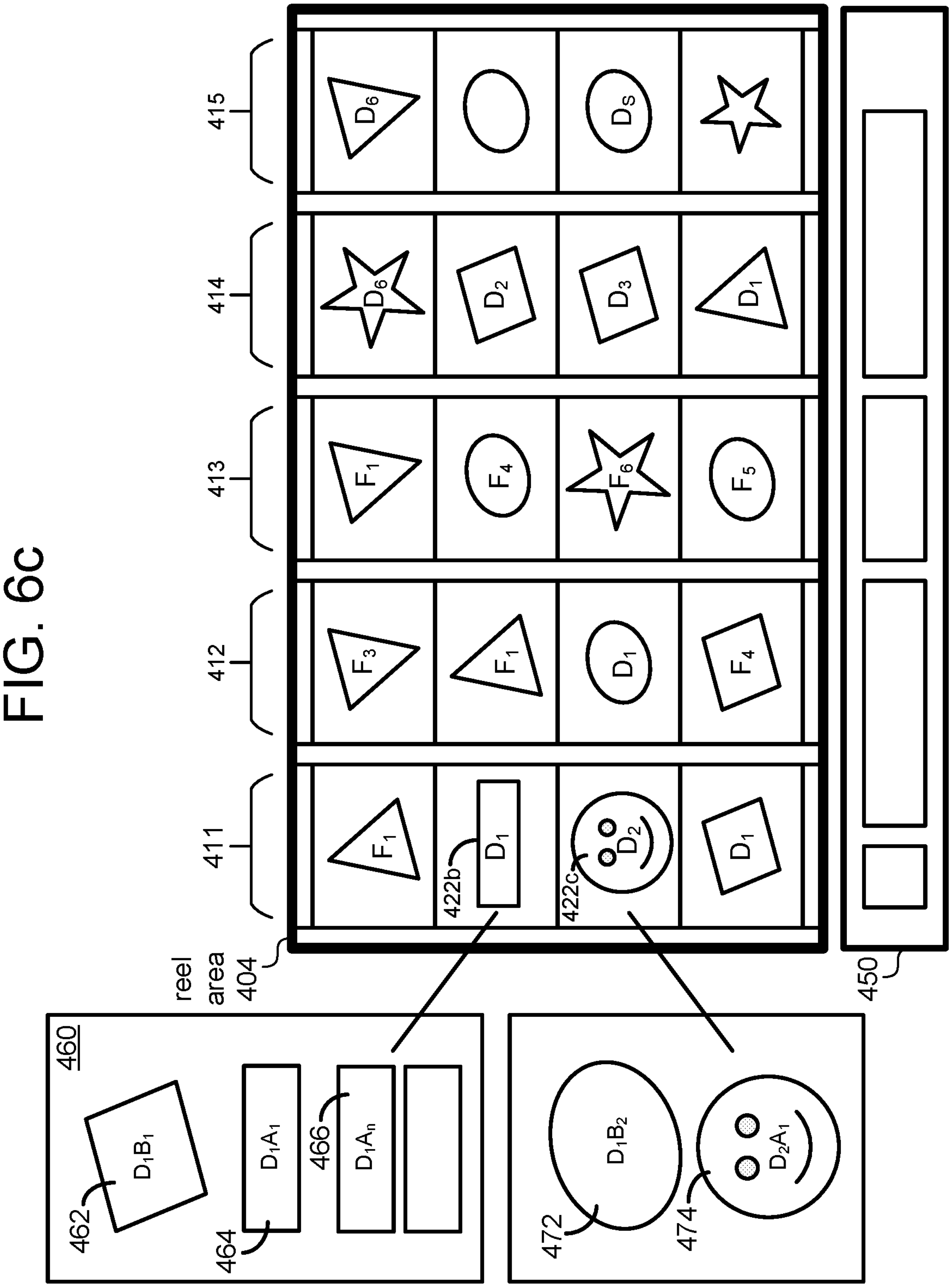

FIG. 6*c* illustrates the reel area 404 during a third game type. At least some additional symbols 422 displayed on the reels for dynamic symbols are different compared with the second game type of FIG. 6*b*. For example, symbol 422*c* is now the special event symbol 474.

Figure 6D:
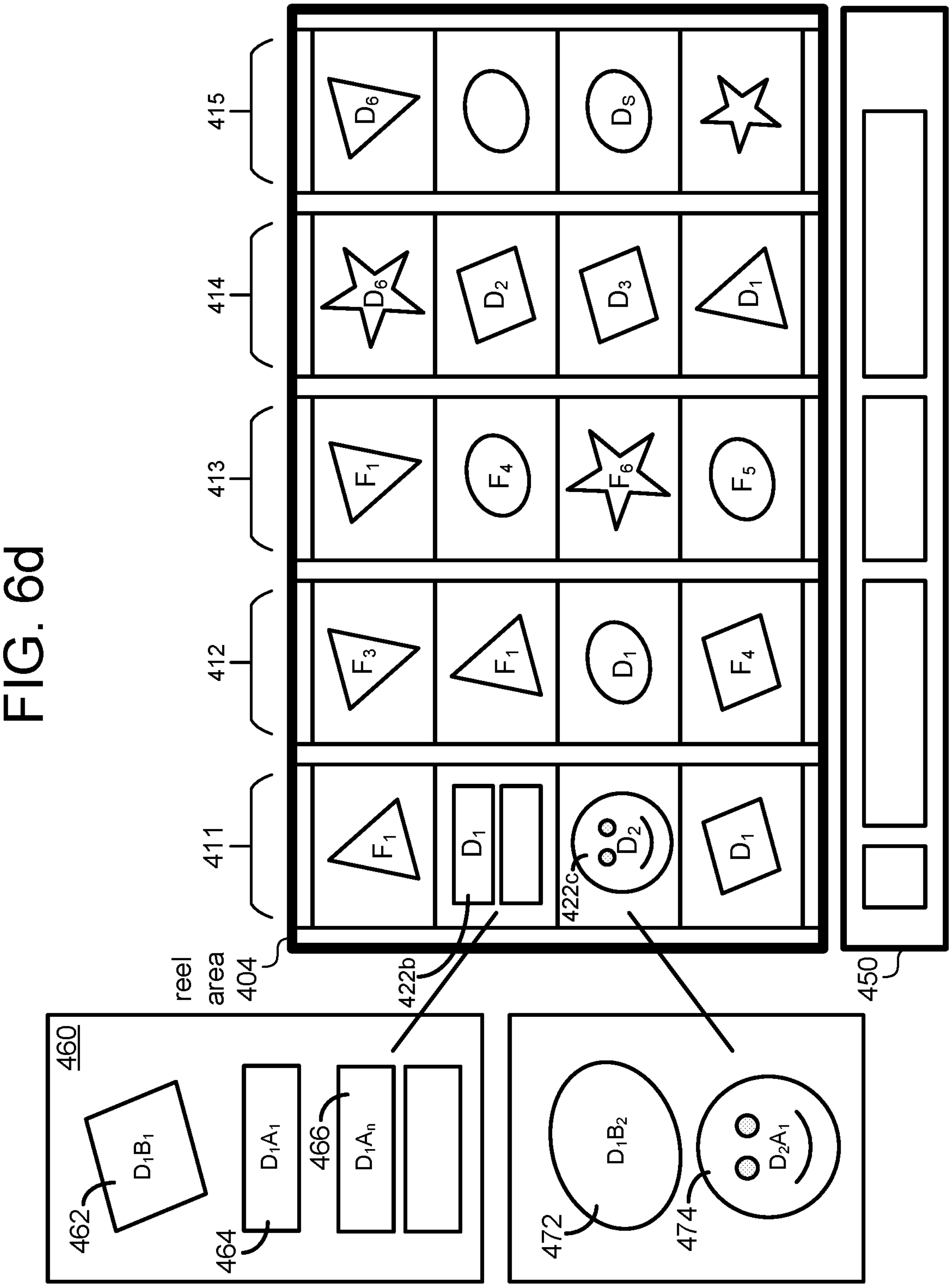

FIG. 6*d* illustrates the reel area 404 during a fourth game type. At least some of the symbols 422 displayed for dynamic symbols on the reels are different compared with the third game type of FIG. 6*c*. In particular, symbol 422*b* is now the special event symbol 466. In some cases, the special event symbol 466 can be available for the fourth game type, but not available for other game types.

D. Example Outcome Determination

During game play, reel symbols are determined for any dynamic symbols on the reel strips used with the game. Determining symbols to be displayed for dynamic symbols can include determining a game type (e.g., an RTP level for a particular play of a particular game mode). The reels, including the symbols selected to be displayed for dynamic symbols, can be spun, or otherwise "activated."

After the reels have landed (stopped) in the reel area, any win conditions are detected and any win amounts are awarded to the player (e.g., credited to the player's credit balance). The base game mode or special event mode defines one or more win conditions, the occurrence of which results in a win amount being awarded. For example, win conditions can be defined as pay lines (also called win lines) across at least a portion of the reel area on a display screen. For a round of play, when a certain combination of symbols appears along a pay line, a win amount corresponding to that combination of symbols and that pay line is awarded. Win amounts can vary according to the combination of symbols and according to the particular pay line along which the combination of symbols appears.

Win amounts are typically determined according to a pay table defined for the base reel game, where the pay table comprehends the various combinations of symbols and pay lines (i.e., the win conditions that may occur in the base reel game). The win conditions for the special event mode can be evaluated in the same way as win conditions for a base reel game, with win conditions being more likely in the special event mode due to the occurrence of special symbols in the side reel(s). The win amount for a round of play may be a fraction of an amount wagered for that round of play for certain win conditions. For other win conditions, the win amount may be much larger than the amount wagered.

The number of pay lines and base credit cost to play depends on implementation. In some example implementations, there are 50 pay lines and a 75 credit cost. There are 2×, 3×, 4×, and 5× bet multipliers (also called bet levels), which sets a max bet of 375 credits. Multipliers can also appear as symbols in side reels. Alternatively, there could be higher bet multipliers (e.g., up to 8×, with a max bet of 600 credits), different credit options, and/or a different number of pay lines.

Alternatively, instead of evaluating win conditions on pay lines across reels in the reel area, an award can be determined according to a "ways" approach. For example, a player may obtain a win entitlement by selecting a number of reels to play and an amount to wager per reel. Examples of such implementations may be marketed under the trade name "Reel Power" by Aristocrat Leisure Industries Pty Ltd. The selection of a reel means that each displayed symbol of the reel (in the reel area) can be substituted for a symbol at one or more designated display positions. In other words, all symbols displayed at symbol display positions in the reel area for a selected reel can be used to form symbol combinations (one symbol per reel in a combination) with any of the symbols displayed at designated, symbol display positions of each of the other reels. For example, if there are five reels and three symbol display positions for each reel (such that the symbol display positions comprise three rows of five symbol display positions), the symbol displayed in the center row is used for a non-selected reel, and the symbols displayed in all three rows are used for a selected reel. Each possible path through the designated (active) symbol display position(s) of the respective reels provides a way to win. As a result, the total number of ways to win is determined by multiplying the number of active display position(s) of each reel, where the active display position(s) for a reel are all display positions in the reel area for a selected reel but only the designated (e.g., center) display position in the reel area of a non-selected reel. As a result, for five reels and fifteen display positions, there are $3^5=243$ ways to win if five reels are selected, 3×3×3×1×1=27 ways to win if three reels are selected, and so on.

In yet further aspects, game winning features (where a win can be an award of credits or another type of award, such as play in a special event) can be determined at least partially without considering pay lines. For example, a given symbol or combination of symbols can be give rise to a winning event even if not associated with a pay line.

E. Example Technical Effects

In terms of technical effects, innovative features relating to the use of dynamic symbols can improve usability of EGMs by enhancing a player's experience, extending player time on the EGMs, and maintaining the interest of current players in the EGMs. In some example implementations, the use of dynamic symbols can provide variety in game play and RTP, including facilitating design or implementation of such game play or RTP options. In particular, increasing the number of special event symbols, or the value of special event symbols, during game play can be engaging for players.

III. Example Techniques for Selecting Dynamic Symbols During Game Play

FIGS. 7*a*-7*f* show different aspects of controlling a user interface ("UI") of an electronic gaming device, such as an electronic gaming machine ("EGM"), to determine a symbol to be displayed for one or more dynamic symbols. The illustrated processes can be for a mode of a base reel game or for a special event, such as a bonus reel game. The display screen can be the main display screen of the electronic gaming device or a secondary display screen.

Figure 7A:
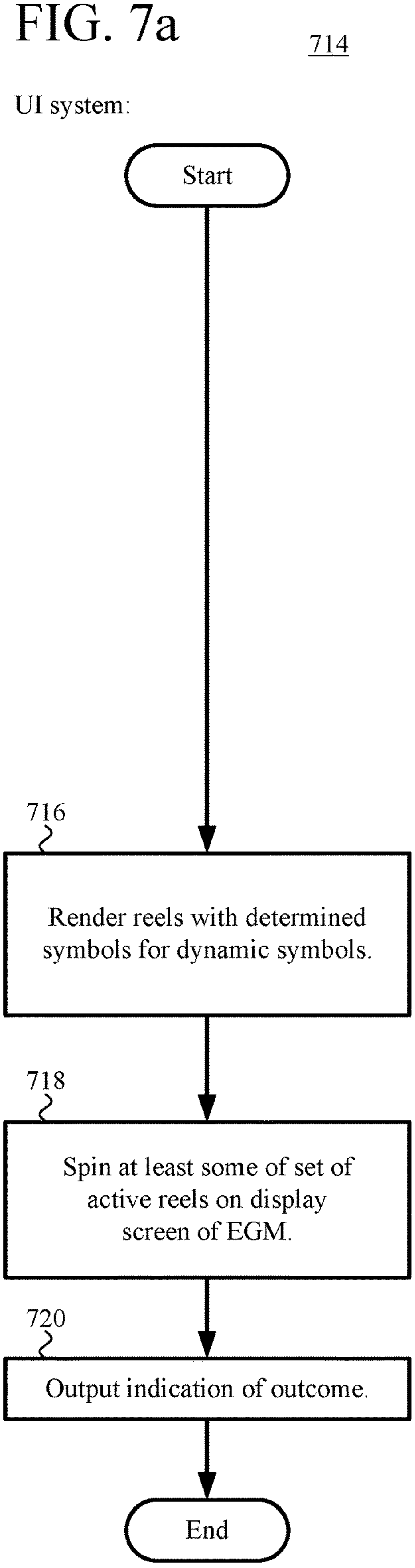
FIGS. 7*a* and 7*b* are flowcharts illustrating example techniques for using dynamic symbols in an EGM from the perspective of a UI frontend and backend, respectively.

FIG. 7*a* shows an example technique 714 for rendering symbols for reels with dynamic symbols on a display screen of an electronic gaming device, from the perspective of a UI frontend. Operations of the example technique 714 shown in FIG. 7*a* can be performed, for example, in a UI system 302 explained with reference to FIG. 3.

Figure 7B:
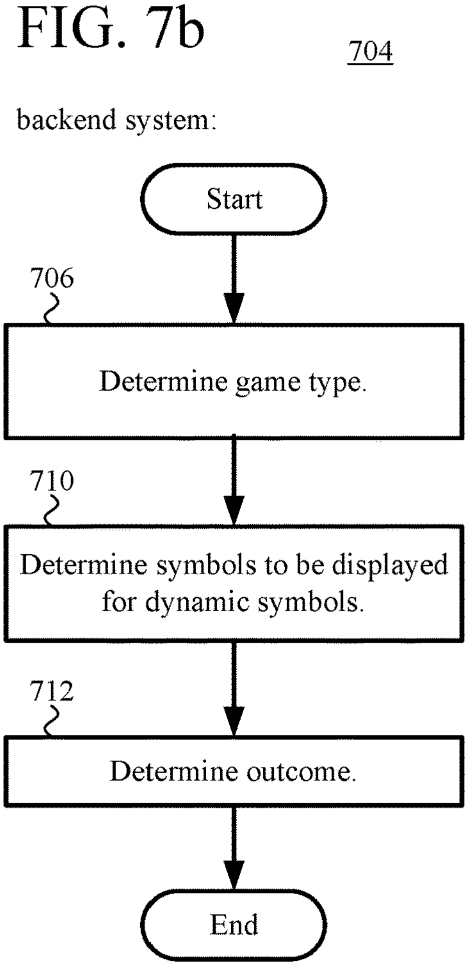
Figure 7C:
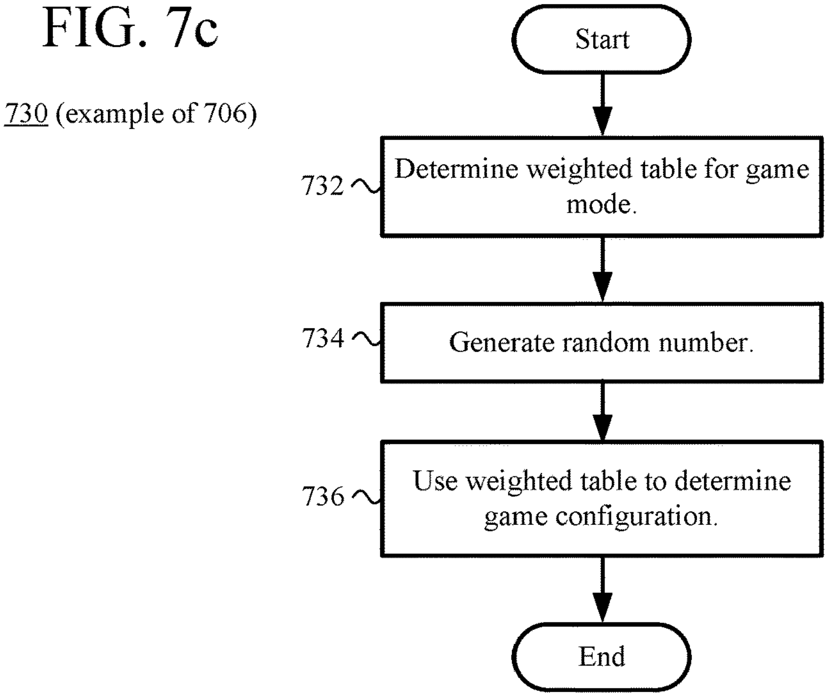
FIGS. 7*c*-7*e* are flowcharts illustrating example techniques for selected operations shown in FIGS. 7*a* and 7*b*, or other related operations.
Figure 7D:
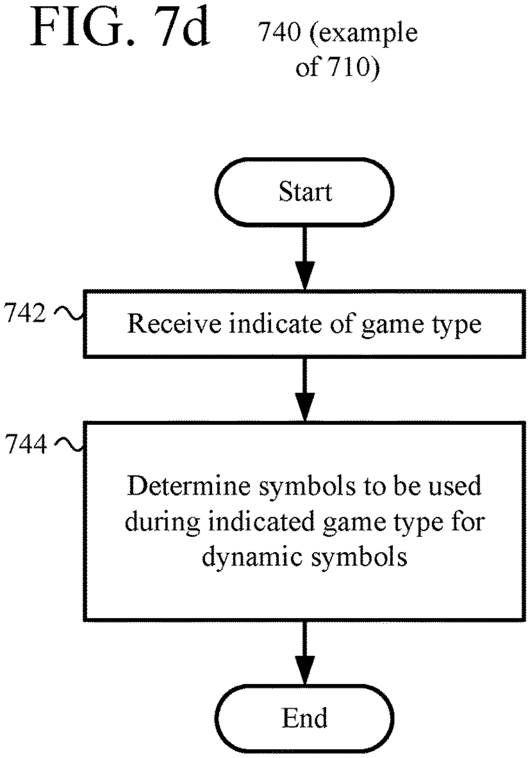
Figure 7E:
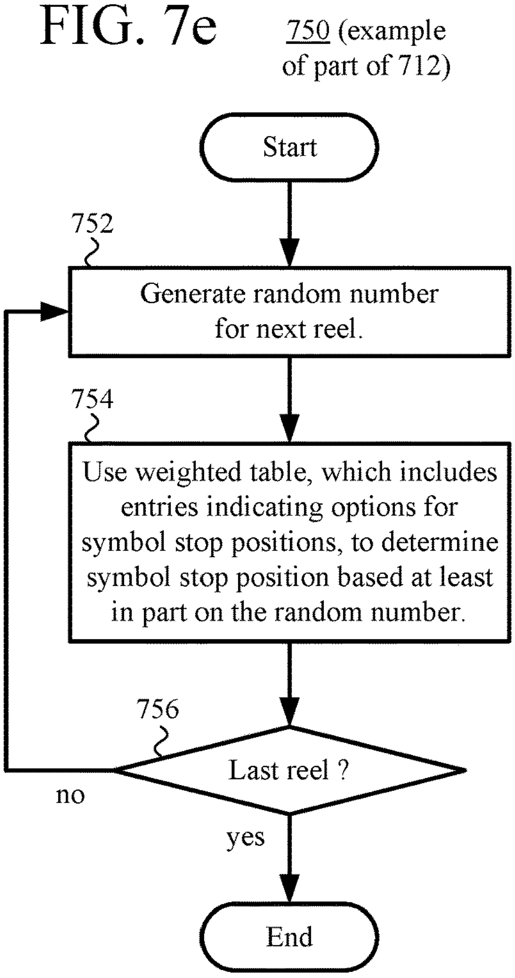
Figure 7F:
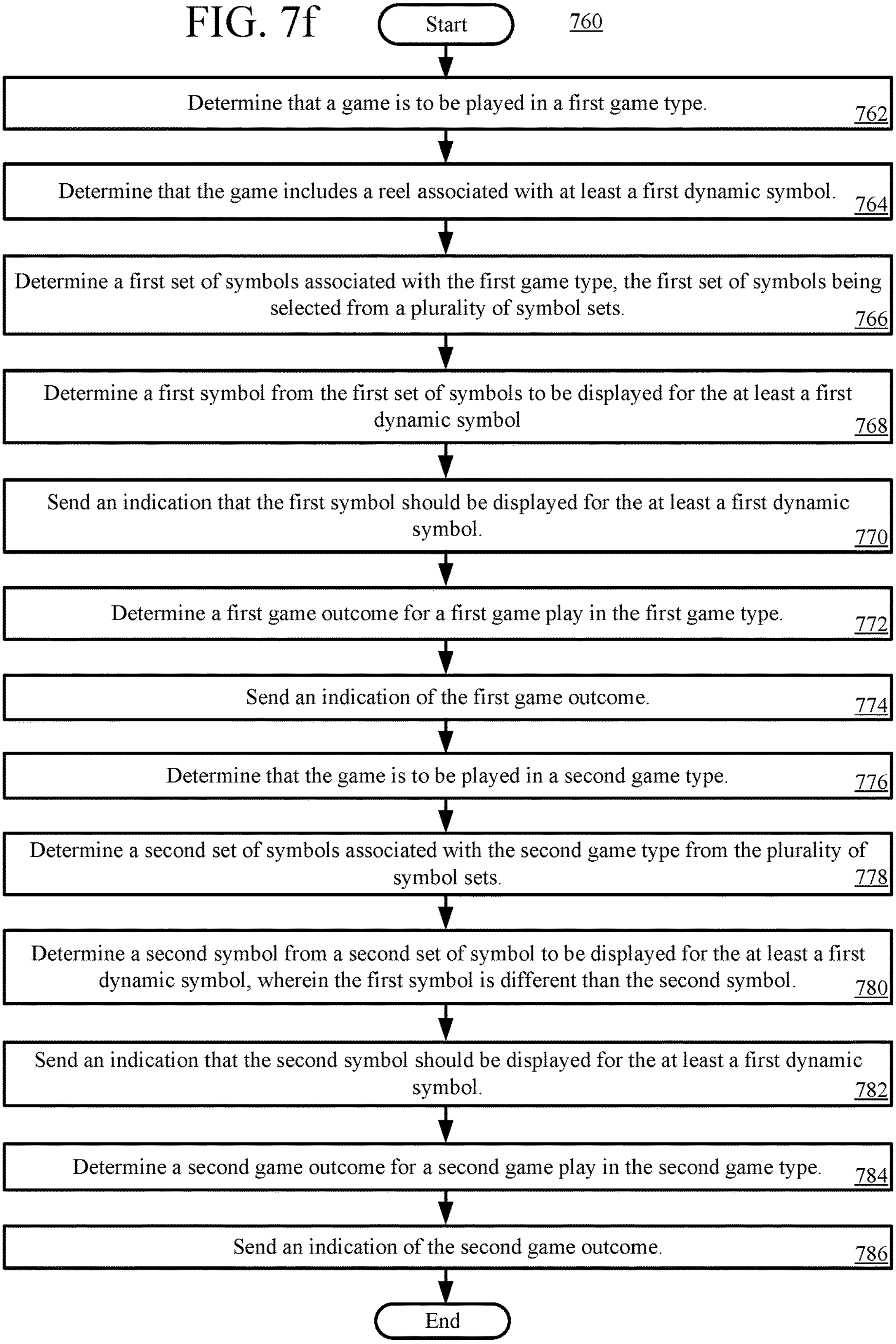
FIG. 7*f* is a flowchart illustrating an example technique for selecting symbols for a dynamic symbol during gameplay in two game modes.

FIG. 7*b* shows an example technique 704 rendering symbols for reels with dynamic symbols on a display screen of an electronic gaming device, from the perspective of a backend. Operations of the example technique 704 shown in FIG. 7*b* can be performed, for example, in a game processing backend system 314 explained with reference to FIG. 3. FIGS. 7*c*-7*e* show example techniques for selected operations shown in FIGS. 7*a* and 7*b*, which can, for example, be performed in a UI system 302 or game processing backend system 314, as appropriate. FIG. 7*f* shows an example technique for determining symbols to be used for dynamic symbols during game play involving two game types (e.g., a high RTP game type and a low RTP game type).

Control logic (such as a game controller 202 described with reference to FIG. 2) can perform the respective techniques shown in FIGS. 7*a*-7*f* The control logic can be implemented using memory and one or more processors that are part of the electronic gaming device and/or part of a gaming system located remotely from the electronic gaming device. For example, the control logic can be part of a UI system 302 and/or a game processing backend system 314. In general, the term "control logic" may refer to a game controller or, more generally, one or more processors, operable to process game play instructions in accordance with game play rules, determine outcomes in accordance with game play rules, and/or generate outputs (e.g., to one or more display screens and/or speakers). Depending on implementation, control logic can be implemented by software executable on a CPU, by software controlling special-purpose hardware (e.g., a GPU or other graphics hardware for video acceleration), and/or by special-purpose hardware (e.g., in an ASIC).

With reference to FIGS. 7*a* and 7*b*, the control logic can start the process (e.g., a special event mode of a reel game) in response to satisfaction of a start condition. In some example implementations, the start condition is checked after initiation of a play of a base reel game. The control logic can receive player input that indicates actuation of a button of the electronic gaming device (e.g., a "play" button or "spin" button), then check the start condition in response to actuation of the button of the electronic gaming device. For example, the start condition is a random event (e.g., randomly starting the process in x % of the plays of a base reel game). In this case, the start condition can be evaluated using a random number and weighted table (e.g., with a first entry defining an option for regular play and a second entry defining an option for the mode). Or, as another example, the start condition can be a configuration of special symbols in the reel area (e.g., a special combination of wild symbols or scatter symbols in a previous play). Alternatively, the start condition can be defined in some other way.

For the process, the reel area spans m reels in a first dimension and spans n symbols in a second dimension orthogonal to the first dimension. The value of m can be 1, 2, 3, 4, 5, 6, 7, 8, or some other number of reels. The value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Also, instead of having the same value of n for all reels across the reel area, the reel area can have different numbers of symbols visible for different reels. Thus, the value of n can be different for different reels (e.g., n=3 for a leftmost reel, n=4 for a second reel, n=5 for a center reel, n=4 for a fourth reel, and n=3 for a rightmost reel).

With reference to FIG. 7*b*, at stage 706, the control logic determines a game type to be used in a game instance, such as determining whether the game will be a high RTP game type or a low RTP game type. Typically, the game type is used to determine symbols that will be displayed for dynamic symbols of an EGM.

One or more symbols are determined at 710 for one or more dynamic symbols associated with the reel strips used in the game instance, such as based at least in part on the game type determined at 706

Typically, dynamic symbols can be converted to different symbols than symbols associated with a base game mode, or can be used to provide a greater proportion of valuable symbols compared to the base game mode. For example, the determined symbols displayed for dynamic symbols can include (1) wild symbols, (2) special symbols (e.g., character symbols), (3) multiplier symbols, and/or (4) combinations of wild symbols, special symbols, and/or multiplier symbols. Thus, dynamic symbols can make win conditions on pay lines more likely, compared to any non-dynamic symbols. In particular, such win conditions can be made more likely by changing one or more symbols displayed for one or more dynamic symbols from a symbol associated with a base game mode to a special event mode symbol. Or, a first base game mode symbol can be replaced with a second base game mode symbol, where the second base game mode symbol makes a win combination more likely, or at least makes a win combination appear to a player to be more likely.

With continued reference to FIG. 7*b*, at 712, the control logic determines an outcome of the process. For example, the control logic sets an amount that depends on presence of win conditions on pay lines through reels. When determining an award amount for a pay line through the reels, the order of the reels may be considered. Alternatively, the control logic determines the outcome of the process in some other way. For example, the control logic sets an amount according to a "ways" approach that considers possible paths through symbols in the reel area, possibly considering which of the reels have been selected or not selected, and possibly considering the order of the reels. In any case, the control logic stores information indicating the outcome for use in later UI-focused operations.

With reference to FIG. 7*a* and the operations 714, at 716, the control logic causes the symbols determined at 710 for dynamic symbols on the reel strips used with the game play to be configured to be displayed on the reel at the appropriate positions. That is, the symbols selected for dynamic symbols, and any non-dynamic symbols, can represent a particular reel strip configuration that will be used for a particular game play (at least for that game type). The reel configuration can determine both what symbols the player will see as the reel spins, as well as symbols that may be used in displaying a game outcome.

The control logic, at 718, spins at least some of the set of the active reels on the display screen. The control logic can receive player input that indicates actuation of a button of the electronic gaming device (e.g., a "play" button or "spin" button), then (after determination of the game mode, game configuration, and active symbols, as described with reference to FIG. 7*b*), initiate the spinning of the at least some of the reels in response to actuation of the button of the electronic gaming device.

At 720, the control logic outputs an indication of the outcome of the process. For example, when the display screen is a main display screen, the control logic renders a graphic (e.g., image, animation) that indicates the outcome of the process on the main display screen or a secondary display screen of the electronic gaming device.

Although FIGS. 7*a* and 7*b* show operations 704 in a series, and show operations 714 in a separate series, the control logic can perform operations for some or all of these stages concurrently. For example, determination of a game type at 706 can concurrently determine symbols to be displayed for dynamic symbols at 710. Different game types can be associated with specific symbols that are shown for dynamic symbols for a game instance of the game type.

FIG. 7*c* illustrates an example of operations 730 that can be performed at stage 706 of process 704 of FIG. 7*b*. At 732, a weighted table can be determined that should be used for a game mode in effect. For example, a base game may use a different weighted table than a special event mode. At 734 a random number is generated, such as using an RNG of an EGM. The random number is compared with a weighted table at 736 to determine a game type (e.g., an RTP level). Determining a game type can include determining a weighted table to be used to determine a game outcome.

FIG. 7*d* illustrates an example of operations 740 that can be performed at stage 710 of process 704 of FIG. 7*b*. At 742, an indication of a game type is received. The game type can be the game type determined at 736. Symbols to be used for dynamic symbols during the indicated game type are determined at 744.

FIG. 7*e* illustrates an example of operations 750 that can be performed at stage 712 of process 704 of FIG. 7*b*. At 752 a random number can be generated for a reel, where the reel has one or more dynamic symbols converted to symbols selected according to the process 704. A weighted table can be consulted at 754, using the random number, to determine a stop position for the reel based at least in part on the random number.

At 756, it is determined whether additional reels remain for which reel outcomes should be determined. If so, the operations 750 can return to 752. Otherwise, the operations 750 can end, such as proceeding to 716 of operations 714. In other cases, a game outcome can be determined in another manner. For example, a single outcome can be determined that specifies symbols to be displayed for all reels.

FIG. 7*f* illustrates operations 760 for determining symbols to be used for dynamic symbols during gameplay that involves two game types. At 762, it is determined that a game is to be played in a first game type (e.g., a game type associated with a particular RTP, such as for a low RTP game type, a medium RTP game type, or a high RTP game type). It is determined at 764 that the game includes a reel associated with at least a first dynamic symbol. At 766, a first set of symbols associated with the first game type is determined. The first set of symbols is selected from a plurality of symbol sets. A first symbol of the first set of symbols to be displayed for the at least a first dynamic symbol is determined at 768. An indication is sent at 770 that the first symbol should be displayed for the at least a first dynamic symbol, such as to a user interface component that causes a reel to be displayed to a player that includes the first symbol.

A first game outcome is determined at 772 for a first game play in the first game type. At 774, an indication of the first game outcome is sent, such as to a user interface component that causes the first game outcome to be displayed to a player.

It is determined at 776 that the game is to be played in a second game type. At 778, a second set of symbols is determined from the plurality of symbol sets that is associated with the second game type. A second symbol from the second set of symbols that is to be displayed for the at least a first dynamic symbol is determined at 780. The first symbol is different than the second symbol. At 782, an indication that the second symbol should be displayed for the at least a first dynamic symbol is sent, such as to a user interface component that causes a reel to be displayed to a player that includes the second symbol.

A second game outcome for a second game play in the second game type is determined at 784. An indication of the second game outcome is sent at 786, such as to a user interface component that causes the second game outcome to be displayed to a player.

Figure 9:
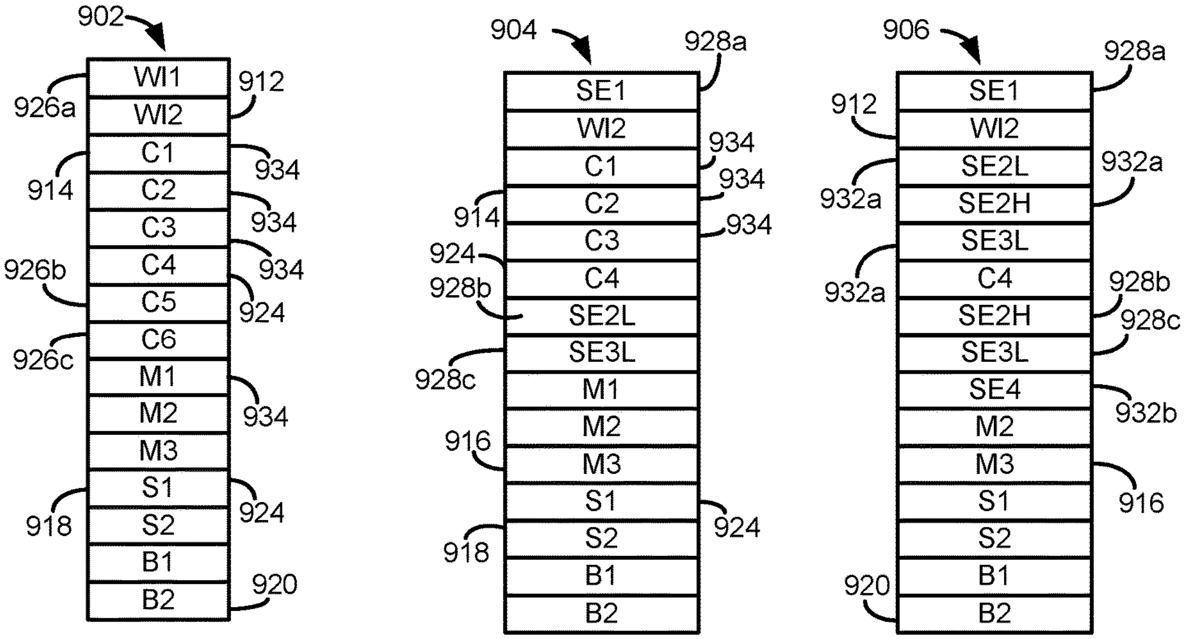
FIG. 9 illustrates example symbol collections that can be used with dynamic symbols for a base game mode and two configurations of a special event mode.

FIG. 9, discussed in more detail below, describes symbol sets 902, 904, 906 that can be used with different game types, where a game type can be determined at least in part using a lookup table, such as a lookup table as shown in FIG. 8*a* or 8*b*, also described in more detail below. The use of these symbol sets 902, 904, 906 can provide an example of the operations of FIG. 7*f*.

At 762, it can be determined, such as using a lookup table of FIG. 8*a* or FIG. 8*b*, that a game instance is to be played in a first game type, such as a low RTP game type. It is determined at 764 that the game type includes a reel strip with a dynamic symbol. For example, it can be determined that a reel position of a reel strip for the low RTP game type is associated with a dynamic symbol that can display symbols 928*a* or 926*b* of symbol sets 902, 904 depending on the game type. At 766, based on the game type being a low RTP game type, the symbol set 902 can be selected.

At 768, it is determined that symbol 928*a* of symbol set 902 should be displayed for the dynamic symbol. For example, a reel strip can be defined for a low RTP game type that indicates that symbol 928*a* should be displayed for a particular dynamic symbol (e.g., at a particular position or stop on the reel strip). An indication that symbol 928*a* should be displayed can be sent, such as to a UI component, so that a reel with the symbol 928*a* can be displayed as part of a game instance. An outcome for a game instance of the low RTP game type can be determined at 772, and sent at 774, such as to a UI component which can display the game outcome to a player.

At 776, it is determined, such as using a lookup table of FIG. 8*a* or FIG. 8*b*, that a game instance is to be played in a second game type, such as a medium RTP game type. Based on the game type being a medium RTP game type, the symbol set 904 can be selected at 778. At 780, it is determined that symbol 928*b* of symbol set 904 should be displayed for the dynamic symbol, rather than the symbol 928*a* of symbol set 902. As shown in FIG. 9, symbol 928*b* is different than symbol 928*a*. An indication that symbol 928*b* should be displayed can be sent at 782, such as to a UI component, so that a reel with the symbol 928*b* can be displayed as part of a game instance. An outcome for a game instance of the medium RTP game type can be determined at 784, and sent at 786, such as to a UI component which can display the game outcome to a player.

IV. Example Weighted Tables.

FIG. 3 shows examples of lookup tables 322A . . . 322N, which are also called weighted tables. In general, a weighted table can be implemented as any data structure that assigns probabilities to different options, in order for one of the different options to be selected using a random number. Different options are represented in different entries of a weighted table. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

Example Weighted Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and pre-determined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 8*a* illustrates an example lookup table 804 with weights. The lookup table 804 represents event probabilities for a special event mode that includes nine plays of the special event mode. For each play, one of three game types is determined from the result of an RNG call and the lookup table 804. The game types include a low RTP game type 806, a medium RTP game type 808, or a high RTP game type 810. Each entry (table cell) includes a count, which corresponds to the weight given to that entry compared to all of the entries of the weighted table. A lower count (smaller weight) indicates a less likely option. A higher count (larger weight) indicates a more likely option. The counts depend on implementation.

It can be seen in table 804 that the probability of a given game type changes as the player progresses through the awarded special event mode play. During early play (spins 1-3) the odds of the medium or high RTP game types being selected are relatively low. During a middle portion of game play (spins 4-6), the odds of a medium or high RTP game type being selected increase somewhat. Later game play (spins 7-9) are shown as associated with much greater odds of a medium or high RTP game type being selected, with the last, ninth, spin having equal odds for the three possible game types.

Column 816 provides overall odds of particular game type being selected over the course of the nine spins. The values in the table 804 can be adjusted so that the totals in column 816 provide a desired overall RTP for an EGM.

Row 818 illustrates the overall odds associated with a given spin. Although the total count is shown as the same for each spin, in other cases different count totals can be used for different spins (e.g., the three possible outcomes can be distributed from a total of 5000 instead of 1500, as shown). In practice, the weighted table can be used to set ranges, where a game configuration will be selected if a random number falls within the range for that configuration. For example, in the column for spin 1, a low RTP game type may be selected if the random number is between 1 and 1450, a medium RTP game type may be selected if the random number is between 1451 and 1497, and a high RTP game type may be selected if the random number is between 1498 and 1500.

Other types of weighted tables can be used, such as weighted table 830, where the odds of achieving a particular game type are consistent between the nine spins, with low RTP game type being the most likely outcome and the high RTP game type being the least likely outcome, with the medium RTP game type having odds between the low and high RTP game type.

FIG. 9 illustrates a low RTP game type symbol collection 902, a medium RTP game type symbol collection 904 and a high RTP game type symbol collection 906. Each symbol collection 902, 904, 906 can include one or more symbol types, such as wild symbols 912, character symbols 914, multiplier symbols 916, special symbols 918, and special event mode symbols 920 (e.g., which can trigger a special event mode). In some cases, a symbol collection 902, 904, 906 can be used for all reel strips in an EGM. In other cases, different reel strips can use different symbol collections, including having some symbols only appear on certain reel strips or having reel strips with different numbers of reel positions or stops.

It can be seen that certain symbols, symbols 924, are included in both low RTP game type symbol collection 902 and the medium RTP game type symbol collection 904. However, symbols 926 of the low RTP game type symbol collection 902 have been replaced by symbols 928 in the medium RTP game type symbol collection 904. Although any type of symbol can be modified between game types, FIG. 9 illustrates that symbols 926, 928, which differ between the low RTP game type symbol collection 902 and the medium RTP game type symbol collection 904 are character symbols 914.

In symbol collection 906, additional symbols have been replaced as compared with symbol collections 902, 904. The special event mode symbols 928 introduced in the symbol collection 904 are maintained in the symbol collection 906. However, in other cases, the special event symbols 928 can be replaced by different special event symbols, or can revert to symbols from the low RTP symbol collection 902, such as symbols associated with a base game mode (either the original symbol or a different symbol, for example symbol 928*a* may change from SE1 to B1, C2, or some other symbol, rather than symbol WI1 as in the symbol collection 902).

The symbol collection 906 includes new symbols 932, which replace corresponding symbols 934 in the base symbol collection 902 and the medium RTP symbol collection 904.

V. Example of Game Play Dynamics with Multiple Game Divisions

This section describes various innovations in user interface ("UI") features of electronic gaming machines ("EGMs"), as well as innovations in features of backend processing for EGMs to implement the UI features. Some of the innovations relate to processes for EGMs that allow a player to switch between game modes, such as switching between a base game and play that has been awarded in a special event (e.g., a bonus game), or between specials events. In some cases, game play can be divided by a wager amount, which can be a set wager amount or wager ranges. Each division can be associated with a game play mode, such as a base game or a special event. A player can be allowed to switch divisions, which can involve leaving a game play mode associated with the current division (which can include a game play status, such as a number of remaining plays in a special event) and entering a game play mode associated with the selected division. The player can resume a game play mode of a particular division by re-selecting that division.

A. Introduction and Example Hardware

Depending on implementation, various form factors of EGMs can incorporate these innovations. For example, for a "thick client" implementation, an EGM (such as a gaming device 104A-X in FIG. 1 or gaming device 200 in FIG. 2) stores computer-executable instructions for controlling one or more wagering games in local memory of the EGM and executes those instructions in one or more local processors of the EGM. The computer-executable instructions for controlling the game(s) may be stored within the EGM (e.g., at a factory) prior to installation of the EGM at a gaming establishment. Or, the computer-executable instructions for controlling the game(s) may be stored within the EGM after installation of the EGM at a gaming establishment (e.g., by downloading the instructions to the EGM over a network, or by installing memory that stores the instructions into the EGM, then configuring the EGM). In such a "thick client" implementation, a game controller of the EGM conducts one of the wagering game(s) and manages various interfaces of the EGM to receive player inputs and commands.

Or, as another example, for a "thin client" implementation, computer-executable instructions for controlling one or more wagering games are stored in memory of a gaming server (e.g., central determination gaming system server or other remote host) and executed in one or more processors of the gaming server. The game server remotely controls one of the wagering game(s) over a network, and the EGM displays screens for the wagering game and manages interfaces to receive player inputs and commands.

The wagering games can include base games as well as bonus games (which can be a type of special event). A "base" or "primary" game may, for example, include play that involves spinning reels. A "bonus" or "secondary" game/feature can add the possibility of winning a relatively large payout. A bonus game/feature may require an additional wager, but typically does not. In specific examples, the bonus game requires an additional wager. In more particular examples, the bonus games require an additional wager of a particular amount, such as an amount previously wagered in the bonus game or a base game from which the bonus game was triggered, or an amount within a range associated with such a prior wager. A single play of a game can constitute a single complete game or wager (e.g., a single spin of the reels or a series of spins which culminate in a final aggregate outcome).

In some example implementations, the EGM or gaming server can conduct a base reel game (for regular play or free spins), a bonus reel game, and a gateway wheel game. The base reel game and bonus reel game use spinning reels and a reel area on a display screen. As in a typical reel game, the reels of the base reel game or bonus reel game "spin" graphically through the reel area on the display screen when a player actuates a "spin" or "play" button, which acts as a "handle pull" event. A game controller randomly selects positions in the respective reels, and the respective reels stop at the selected positions, with some number of symbols visible in the reel area for each of the reels. For example, for a given reel, the game controller generates a random number and determines a position on the reel strip of the reel using the random number (e.g., with a weighted table). The game controller generates different random numbers for the respective reels that are spun. In this way, the game controller determines which symbols of the respective reels are visible in the reel area on the display screen.

In general, a display screen (or simply "display" or "screen") is an area that conveys information to a viewer. The information may be dynamic, in which case, the display screen may use LCD technology, LED technology, CRT technology, or some other display technology. A main display screen (also called a primary game screen or main display) can be a display screen or an area of a display screen used to display game information related to a base game, such as a video representation of one or more spinning reels. A secondary display screen (also called a secondary game screen or bonus display) can be a display screen or an area of a display screen used to display secondary game information, such as animations and other graphics associated with a bonus game.

A base reel game or bonus reel game may award a special mode to a player. A special mode may enhance an EGM and the experience of players by adding elements of excitement and chance. The special mode can utilize a different set of reels, display screens, controls, symbols, etc. than the base reel game or bonus reel game in normal operation. Alternatively, the special mode can reuse or reconfigure at least some of the reels, display screens, symbols, etc. of a base reel game or bonus reel game. The special mode for a base reel game or bonus reel game can be started in response to satisfaction of a start condition. For example, the special mode can be randomly triggered. Alternatively, the special mode can be triggered in some other way (e.g., a combination of symbols in a previous play).

B. Example Supplemental Information Area Indicating Multiple Gameplay Divisions According to a disclosed embodiment, gameplay on an EGM may be associated with different gameplay divisions, where each division can be in a game mode, or have a game type, that is independent of other gameplay divisions. As an example, consider an EGM that includes five wager levels, 1-9 credits, 10-19 credits, 20-29 credits, 30-39 credits, and 40-49 credits. Each of these wager levels can be considered a division. Consider further that this example EGM includes a base game and a special event, where the special event includes nine plays of the special event before returning to the base game, and where gameplay features, gameplay odds (e.g., RTP, such as using different weighted tables for different gameplay stages, or a weighted table that accounts for gameplay stages), or both change during the course of play during the special event mode. A player may concurrently (and, typically, optionally) have active, or available, game play at multiple divisions, and where the divisions may be in, and may transition between, gameplay modes (e.g., base mode or special event mode) or game types. A player may selectively switch between gameplay divisions. Typically, only a single division is active at a given time.

A player may start a game at a first division, which is in a base game mode. During play in the first division, the player may be awarded play in a special event, such as receiving a set number of spins (e.g., nine spins), where the special event may have stages (such as three stages), such that gameplay, RTP, or both change during special event play. Assume the player plays three of nine spins in the special event, reaching a second stage. The player may choose to leave the first gameplay division and play a game at a different division. Assume the player starts gameplay at a second division. The second gameplay division starts in the base game mode. During play in the second gameplay division, the player may choose to play at another division, including returning to the first division. When the player returns to the first division, the player resumes special event play with the fourth (of their original nine) spin in the special event mode, which will set the game back in the special event mode, at the second stage.

Figure 10:
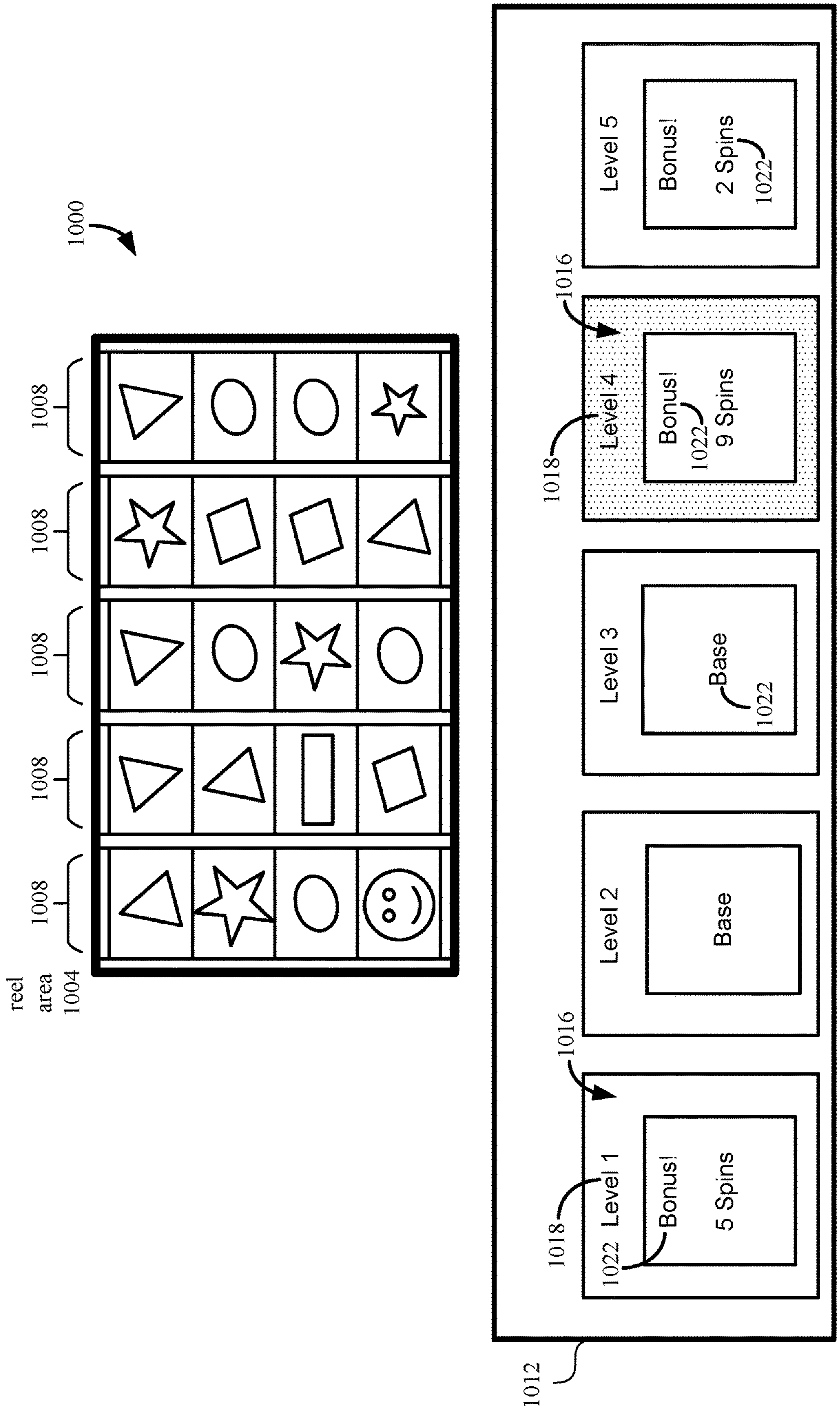
FIG. 10 is an example representation of an example display screen of an EGM that includes multiple gameplay divisions, where a player may switch between gameplay divisions, in some example implementations.

FIG. 10 is a diagram that represents an example display screen 1000 on electronic gaming device that allows players to switch between different gameplay divisions for gameplay on the EGM. The display screen 1000 includes a reel area 1004, having a plurality of reels 1008. The reel area 1004 and reels 1008 can be implemented at least generally as described for the reel area 404 and reels 411-415 of FIG. 4. However, in other cases, an EGM can include reels that do not include dynamic symbols according to the present disclosure. In addition, the EGM can be a game other than a reel-based game.

The display screen 1000 includes a supplemental information area 1012, which can include some or all of the information described with respect to the supplemental information area 450 of FIG. 4. However, in some implementations, the supplemental information area 1012 does not include information associated with the supplemental information area 450. Or, an EGM can include separate supplemental information areas, one corresponding to the supplemental information area 1012 and one corresponding to the supplemental information area 450.

The supplemental information area 1012 displays status information 1016 regarding game divisions. The status information can include an identifier 1018 of the game division. In some cases, the identifier 1018 can correspond to a wager level (e.g., 1×, 2×, 3×, 1-9 credits, 10-19 credits, etc.). When the game divisions are based on wager amounts or levels, the identifier 1018 can convey the wager level.

The status information 1016 can also include division game status information 1022. The game status information 1022 can provide information regarding a game mode (e.g., base game, special event), and, when relevant, game play information, such as a number of plays remaining in a special event. The status information 1016 for a currently-active division can be visually highlighted to assist a player in determining the status of a current gameplay division. Visual highlighting can include presenting the visual information 1016 in a different color, in a different intensity (i.e., brightness), or providing animation or other visual effects that distinguish the information for the active division from other, inactive divisions.

In some cases, the status information 1016 can be selectable by a player to switch between gameplay divisions, such as when the status information is displayed on a touchscreen and the player touches the screen portion associated with the status information 1016 of a game division they wish to select. In other cases, player selection can be received through buttons associated with different divisions, or other input means (e.g., a joystick, keypad, mouse, trackball, etc.).

The supplemental information area 1012, or another display associated with the EGM, can display other information relating to gameplay divisions, or actions taken with respect to gameplay divisions. As explained, different gameplay divisions can be associated with different gameplay modes (e.g. a base game mode or a special event mode) or statuses (e.g., the odds of a particular game type being selected may differ between gameplay divisions in a special event mode) that are associated with different RTPs. So, a player could move from a gameplay division associated with, or having the potential for, a higher RTP to a gameplay division associated with a lower RTP (or having a high RTP be less likely).

When a player takes an action to move from a gameplay division that is in a particular mode or other state, a warning can be displayed to the player. For example, the warning may be provided if the user is currently playing a gameplay division in a special mode and chooses to move to another gameplay division. An example warning can be:

WARNING Special Event Mode Still Active
N Spins Remaining!
Bet X to Complete Special Event Mode Spins After a warning is provided, in some implementations, a player may need to reconfirm their selection to move to another gameplay division. In other implementations, the warning is provided, but gameplay is switched to the selected gameplay division in response to the original player input.

Switching between gameplay divisions may not always generate a warning or other message. For example, a warning may not be provided if a current gameplay division is not in a special event mode. Or, a warning may not be provided if a player selects a gameplay division that is in a special event mode, even if a current gameplay division is also in a special event mode.

In some cases, particularly when a special event mode requires an additional wager for special event play, special event mode play is associated with in game instances that are independent from base game instances, such as a base game instance that triggered a special event mode. So, for example, if an EGM has gameplay divisions in a special event mode and a user selects to cease play on an EGM (chooses to "cash out"), or runs out of credits or has an insufficient number of credits remaining for a current wager level, a different user may start play on the EGM and can use the special event mode play, taking advantage of potentially higher RTP associated with the special event mode. Accordingly, if special event mode play remains, a warning can be provided if a user runs out of credits in an EGM or selects to cash out. An example warning if a user runs out of credits, or if an amount of credits remaining is less than a current wager level, can be:

WARNING Special Event Mode Still Active
N Spins Remaining!
Insert Additional Credits to Complete Special Event Mode Spins An example warning if a user chooses to cash out with special event mode spins remaining can be:

WARNING Special Event Mode Still Active
N Spins Remaining!
Continue Play to Complete Special Event Mode Spins

C. Example Transition Between Gameplay Divisions

Figure 11A:
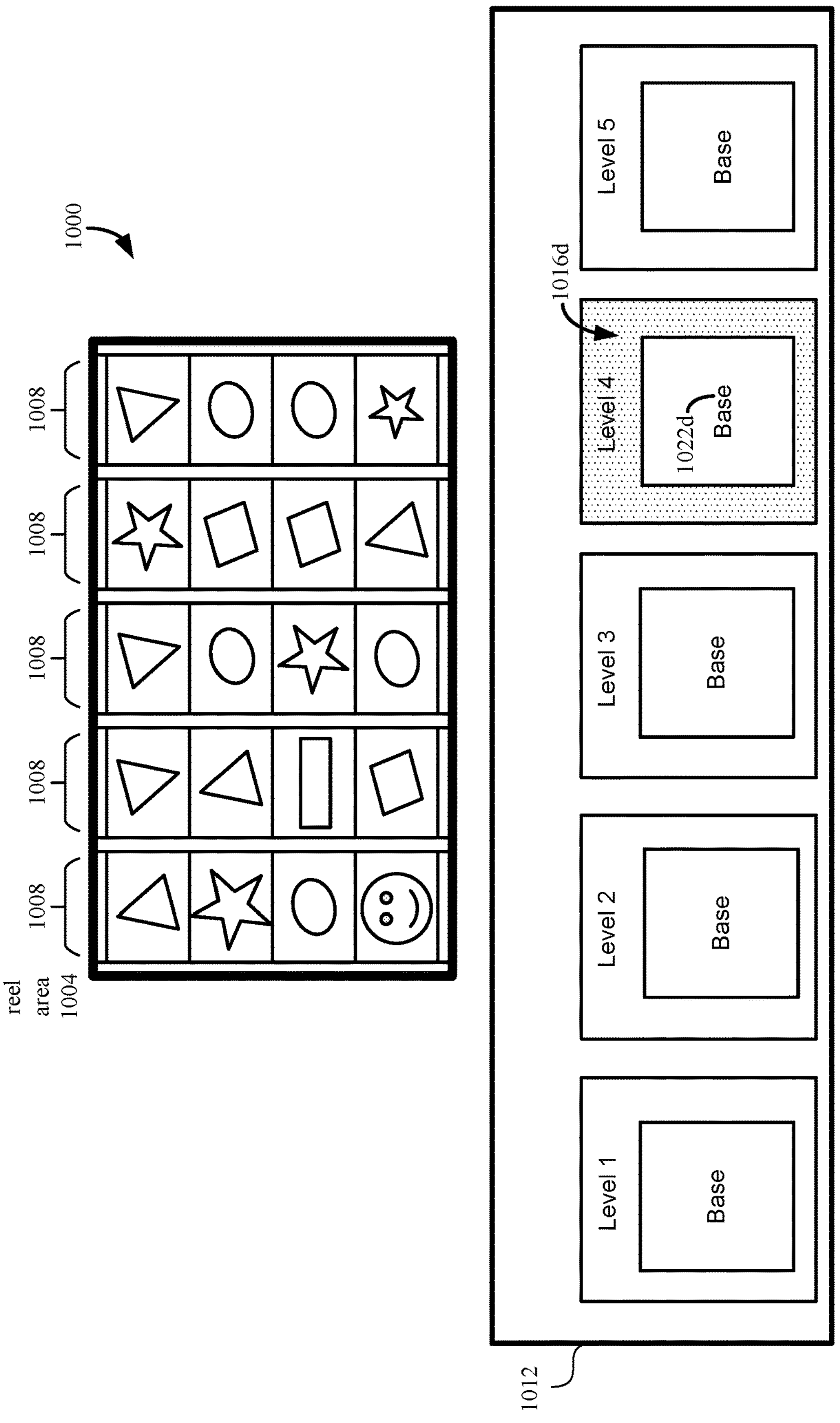
FIGS. 11*a*-11*e* are example representations of an example display screen of an EGM that includes multiple gameplay divisions, showing how the display screen can change as a player switches between gameplay divisions and as gaming states change for at least a portion of the gameplay divisions.

FIGS. 11*a*-11*e* illustrates how information in the supplemental information area 1012 can change as a player switches between gameplay divisions, and as an EGM transitions between game modes for a given gameplay division. FIG. 11*a* can represent an initial state of the EGM. A player can select to initiate gameplay at particular division, in this case "Level 4," which is indicated by highlighting the status information 1016*d* associated with level 4. The supplemental information 1016*d* can be visually highlighted to indicate that it is the active division, and the game status information 1022*d* can be updated to reflect that the gameplay division is in a base game mode.

Figure 11B:
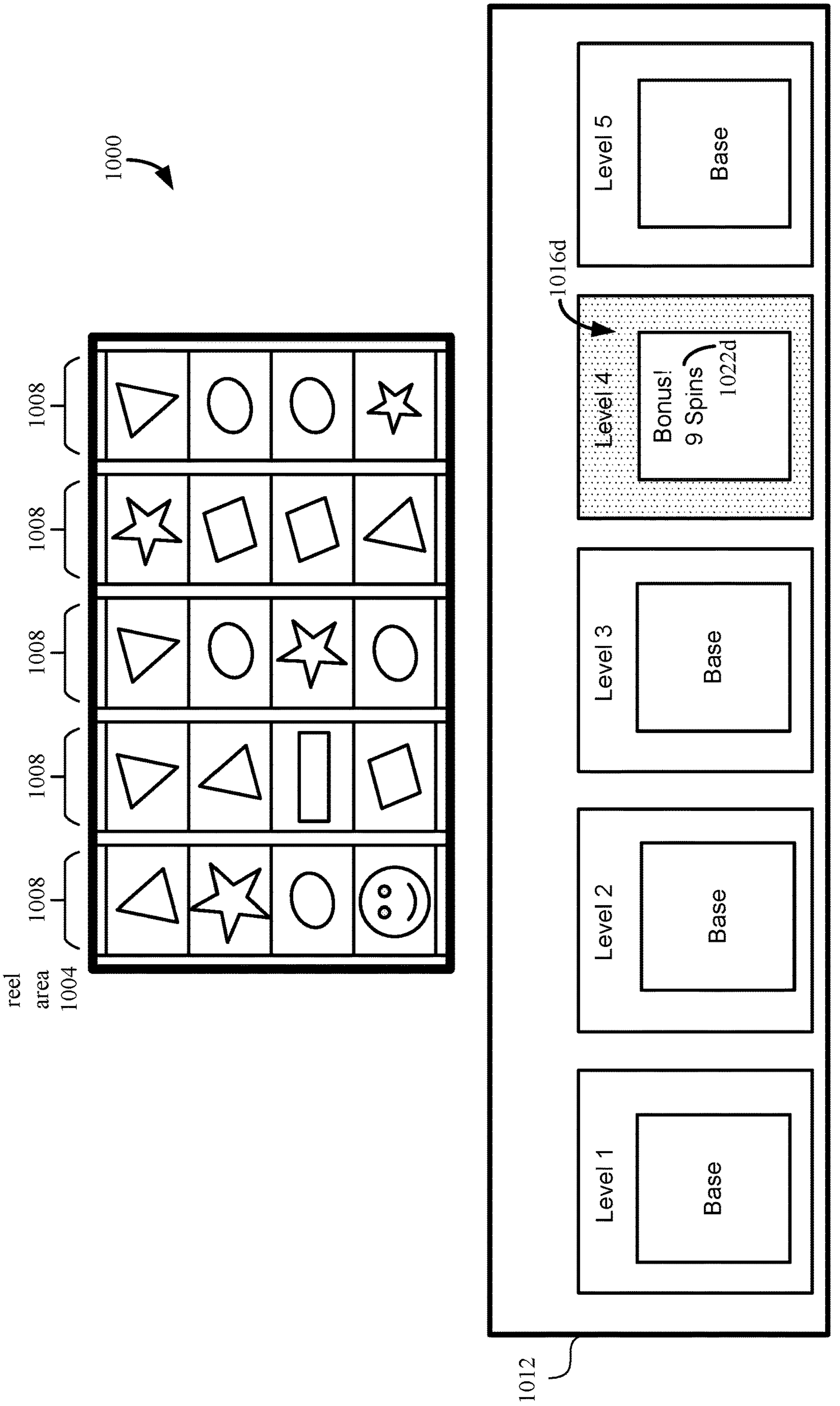

During gameplay at "level 4," a special event, such as a bonus game, may be triggered. As shown in FIG. 11*b*, the game status information 1022*d* can update to reflect that the game division is in a special event mode. Additional information can be provided for the game status information 1022*d*, such as a number of plays (here, spins) remaining in the special event mode. During play at level 4, a player may choose to leave (or pause) game play at this level.

Figure 11C:
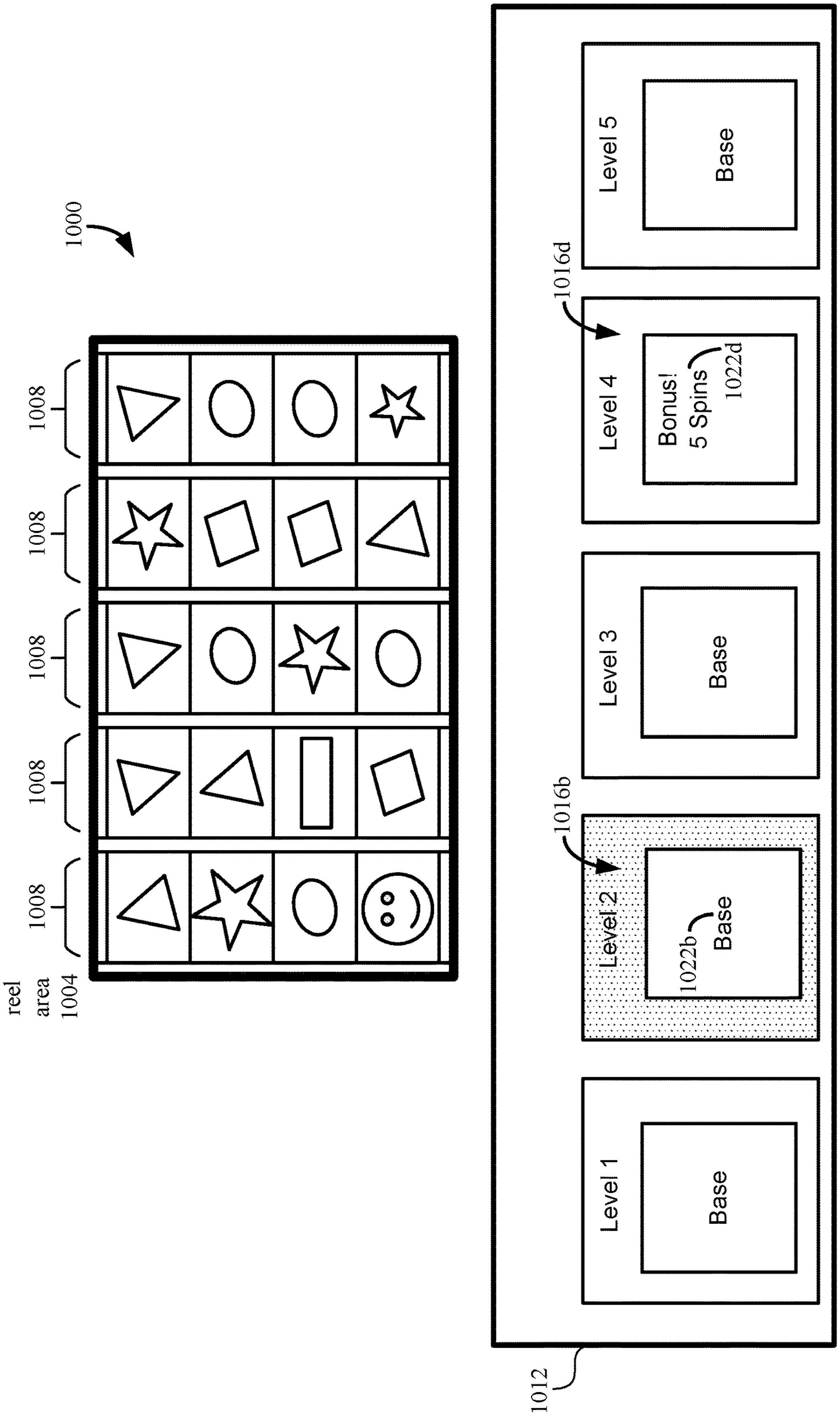

As shown in FIG. 11*c*, the player has chosen to leave level 4 after playing 4 of their 9 bonus spins and selected to play level 2. The status information 1016*b* has been highlighted to indicate that this game division is active, and the game status information indicated that the level 2 game division is in a base game mode. Status information 1016*d* can be de-highlighted, to indicate that it is no longer active.

Figure 11D:
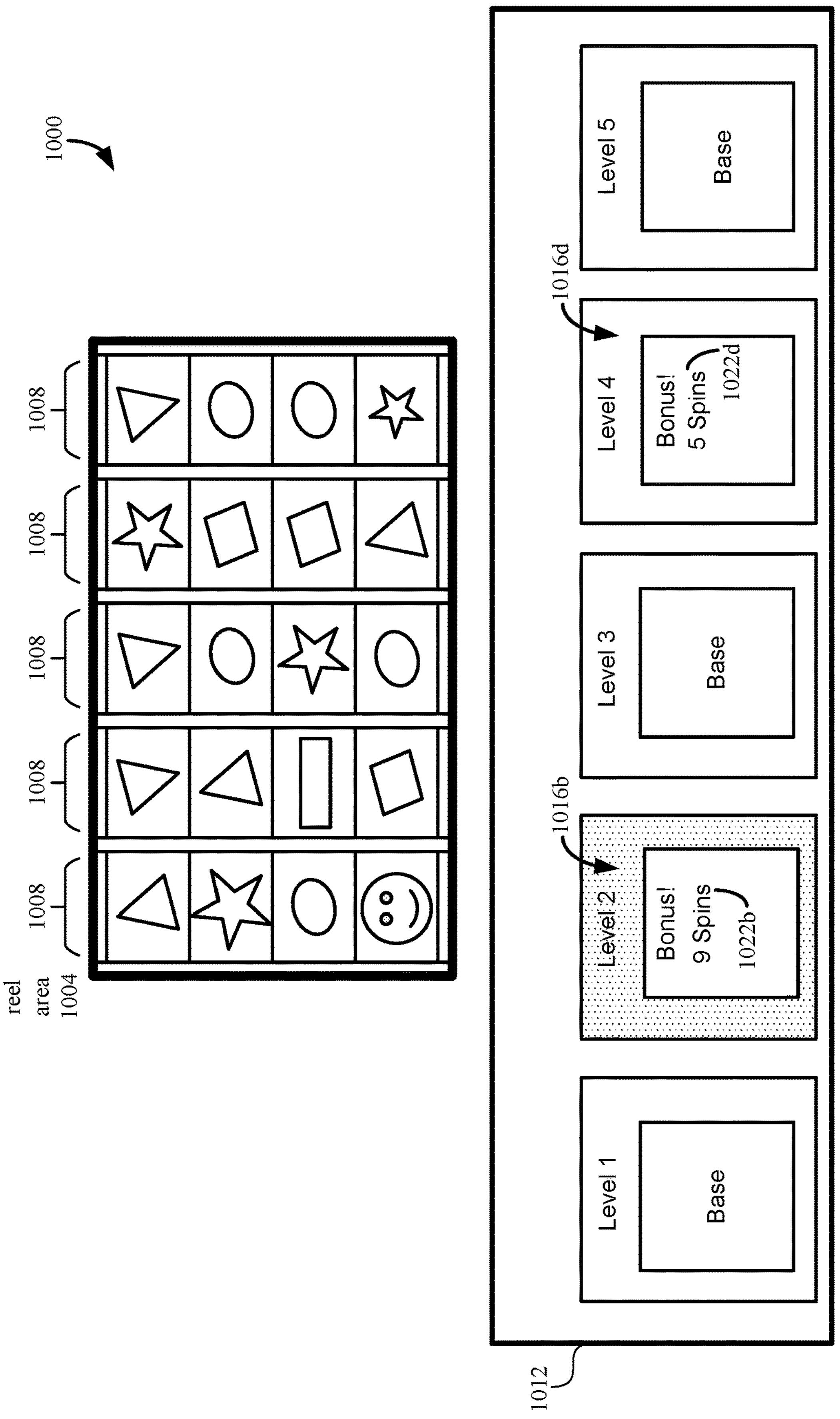

After a period of time, a special event may be triggered for game play at level 2, as shown in FIG. 11*d*. The game status information 1022*b* can be updated to indicate that a special event mode is in effect for this gameplay division, including indicating that nine spins remain. During gameplay at level 2, the player may again choose to play at another division.

Figure 11E:
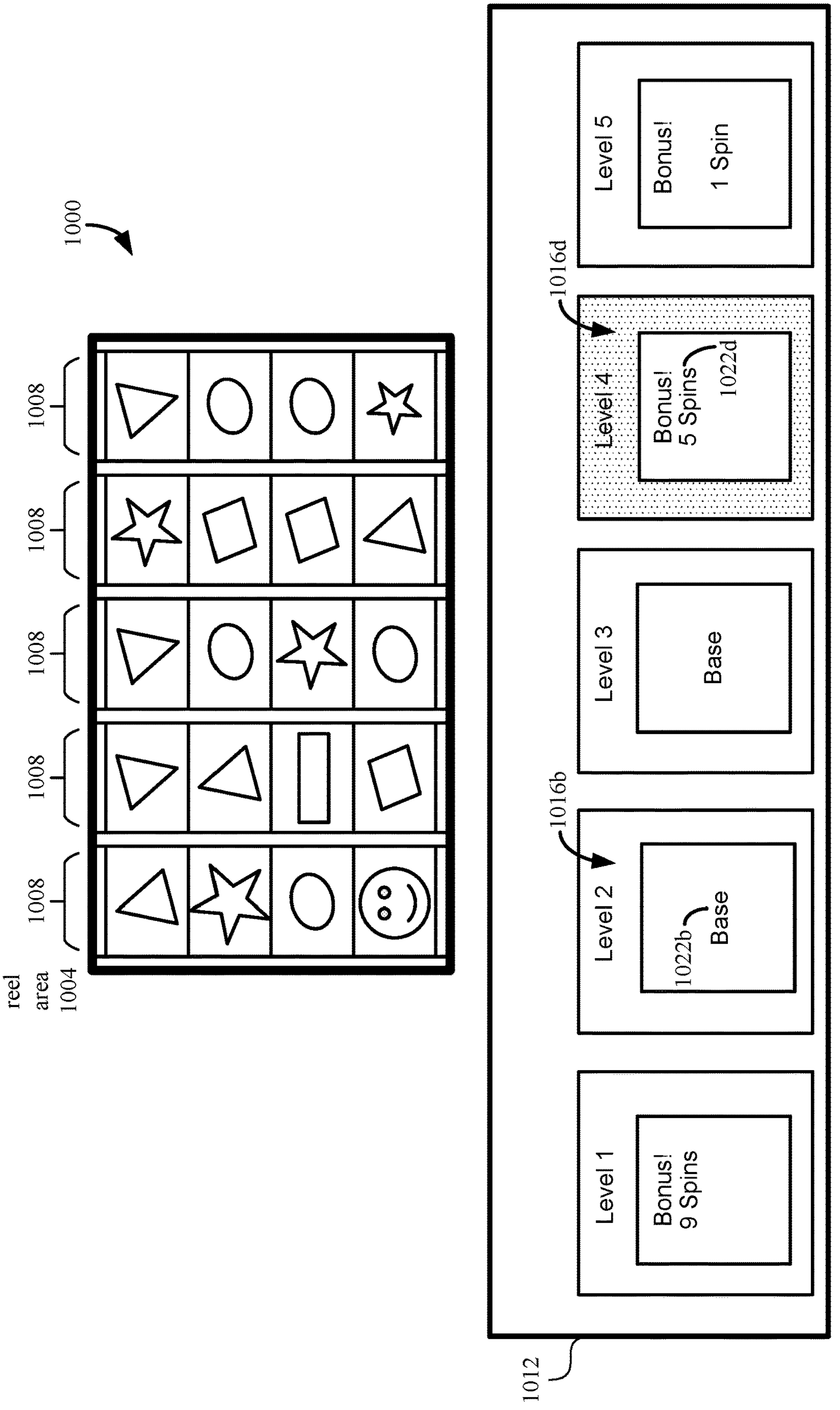

FIG. 11*e* illustrates that, after a passage of time, a player has all five game play divisions in various game play states, and has returned to level 4 to continue playing the special event, at the same game state (e.g., 5 remaining spins) as when they left level 4. The player has used all of their bonus plays for level 2, and the game status information 1022*b* indicates that this game division is back at the base game mode.

D. Example Technical Effects

In terms of technical effects, innovative features relating to the use of multiple gameplay divisions described herein can improve usability of EGMs by enhancing the player's experience, extending player time on the EGMs, and maintaining game play by current players of the EGMs. In some example implementations, the use of multiple gameplay divisions can provide variety in game play and RTP. In particular, allowing a player to switch between gameplay divisions can allow a player to have more control over their game play experience, including pacing play in special events that can create enhanced player excitement.

VI. Example Techniques for Implementing Multiple Gameplay Divisions

Figure 12:
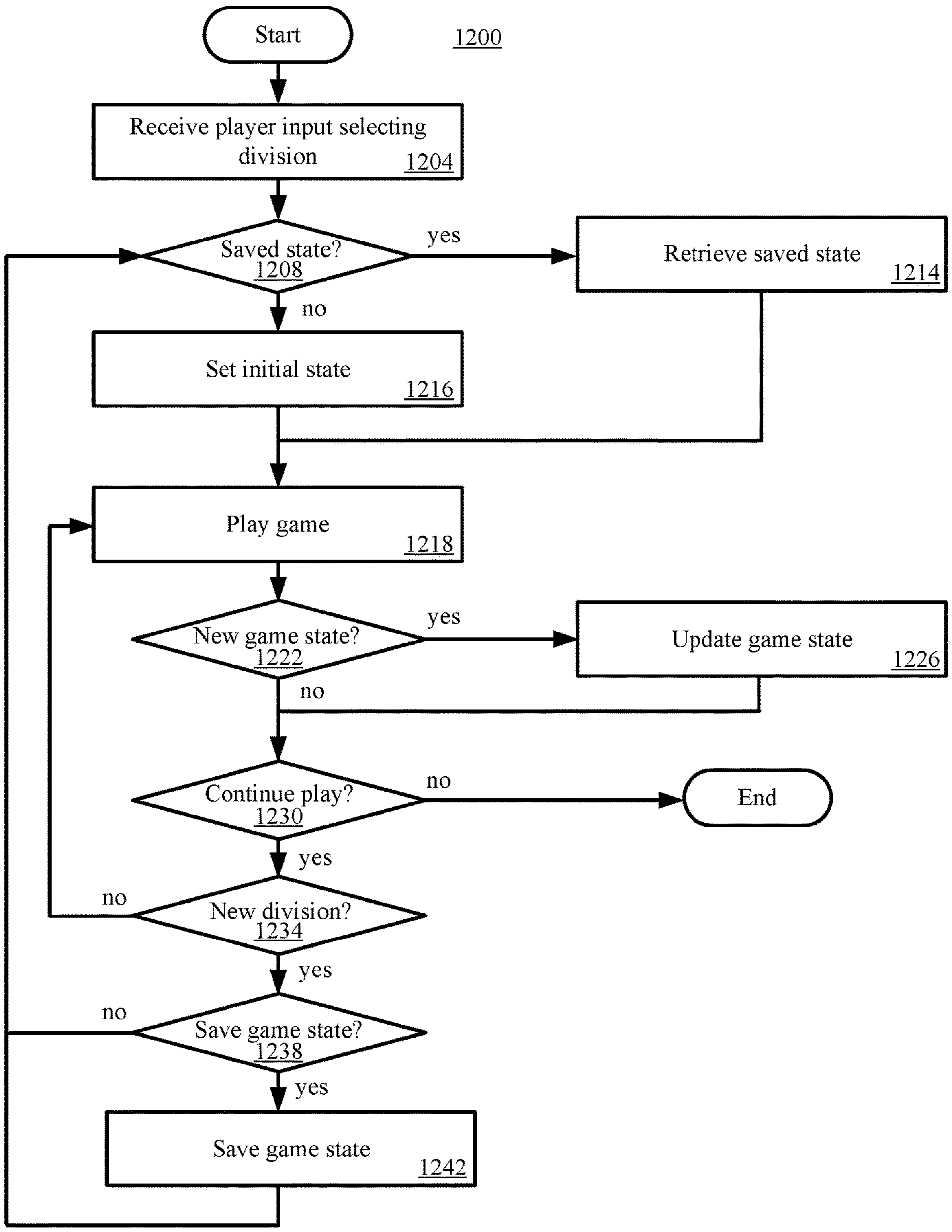
FIG. 12 is a flowchart illustrating a technique for an EGM that allows a player to switch between gameplay divisions, including operations to save a game state so that a game state for a division can be later resumed.

FIG. 12 is a flowchart of an example method 1200 of a disclosed innovation that allows a player to switch between different gameplay divisions (e.g., wager amounts or levels). At 1204, player input is received selecting a gameplay division of an EGM for play. It is determined at 1208 whether the selected division is associated with a saved state. In some cases, the saved state is associated with the same player providing the player input 1204. In other cases, the saved state can be associated with a different player. That is, in some implementations of the disclosed innovations, game states are associated with a specific EGM (and gameplay division thereof), not a particular player. Thus, if a first player ceases play, the game state that is active when a second player initiates play will be used when a second player initiates play.

If it is determined at 1208 that a saved state exists, that state is retrieved at 1214. If no saved state exists, an initial state is set at 1216. After retrieving a state at 1214, or setting an initial state at 1216, the game in the initial or retrieved state is played at 1218. Game play can involve receiving a wager amount from a player and determining a game outcome. In some cases, a game outcome can include transitioning to a new game state, such as a special event, or a different stage of a special event. Some games, such as special events, can include a number of plays. If one of the plays is used in playing the game at 1218, an updated number of remaining plays can also be considered a new game state. If it is determined that a new game state exists, the game state is updated at 1226, such as updating a number of remaining plays in a special event or an indication of a game mode, stage, or configuration.

If a new game state does not result from playing the game at 1218, or after the game state is updated at 1226, the method proceeds to 1230. At 1230, it is determined whether the player intends to continue to play on the EGM. If the player does not wish to continue to play, the method 1200 can end. In other cases, the method 1200 can simply pause until another player plays the EGM, at which point the method can continue from 1234, as if the original player opted at 1230 to continue play.

At 1234, it is determined whether the player wishes to switch game play to a different division of the plurality of available divisions. If not, the method 1200 can return to 1218. If the player does wish to select a new division, it is determined at 1238 whether the game state for the current division should be saved. If the game state should be saved, the game state is saved at 1242. For example, if the division is in a special event mode, and special event play is still available, the game state can be saved at 1242. Saving at 1242 can include saving an indication of a game mode (e.g., special event or base mode), game stage or configuration, or a number of remaining plays in a special event. If the division is in a base game mode, at least in some cases, saving the game state can be omitted. For example, a base game can be considered a default state, which will be used if no saved state exists for the given game division. In other cases, the status of being in a base or default state can also be considered a game state that should be saved at 1242. If the game state is not to be saved, or after the game state is saved at 1242, the method 1200 returns to 1208.

FIGS. 13*a* and 13*b* show, respectively, example operations 1300 occurring at a user interface and example operations 1350 occurring at a backend in conjunction with an EGM that allows a player to switch between gameplay divisions of the EGM, where gameplay divisions can be associated with discrete (e.g., independent) gameplay modes or game types. Operations of the example technique 1300 shown in FIG. 13*a* can be performed, for example, in a UI system 302 explained with reference to FIG. 3. Operations of the example technique 1350 shown in FIG. 13*b* can be performed, for example, in a game processing backend system 314 explained with reference to FIG. 3.

Control logic (such as a game controller 202 described with reference to FIG. 2) can perform the respective techniques shown in FIGS. 13*a* and 13*b*. The control logic can be implemented using memory and one or more processors that are part of the electronic gaming device and/or part of a gaming system located remotely from the electronic gaming device. For example, the control logic can be part of a UI system 302 and/or a game processing backend system 314. In general, the term "control logic" may refer to a game controller or, more generally, one or more processors, operable to process game play instructions in accordance with game play rules, determine outcomes in accordance with game play rules, and/or generate outputs (e.g., to one or more display screens and/or speakers). Depending on implementation, control logic can be implemented by software executable on a CPU, by software controlling special-purpose hardware (e.g., a GPU or other graphics hardware for video acceleration), and/or by special-purpose hardware (e.g., in an ASIC).

Taking first the operations 1300, at 1304 a plurality of gameplay division indicators are displayed to a player. Player input is received at 1308 selecting a first gameplay division indicator of the plurality of gameplay divisions indicators. At 1312, a first gameplay outcome for a first gameplay instance associated with the first gameplay division indicator is displayed. The first gameplay outcome is associated with a first gameplay state.

Player input is received at 1316 selecting a second gameplay division indicator of the plurality of gameplay division indicators. At 1320, a second gameplay outcome is displayed for a second gameplay instance associated with the second gameplay division indicator. Player input is received at 1324 selecting the first gameplay indicator. At 1328, a third gameplay outcome for the first gameplay instance is displayed. The third gameplay outcome is determined at least in part by the first gameplay state.

For the operations 1350, at 1354, gameplay is set to a first gameplay division of available gameplay divisions based on first player input. A first gameplay outcome for a first gameplay instance associated with the first gameplay division is determined at 1358. The first gameplay outcome is associated with a first gameplay state. At 1362, the first gameplay state is saved in response to second player input selecting a second gameplay division of the plurality of gameplay divisions. Gameplay is set to the second gameplay division, at 1366, based on the second player input.

At 1370, a second gameplay outcome is determined for a second gameplay instance associated with the second gameplay division. Gameplay is set to the first gameplay division at 1374 based on third player input. It is determined at 1378 that the first gameplay division is associated with the saved first gameplay state. The saved first gameplay state is loaded at 1382. At 1386, a third gameplay outcome is determined for the first gameplay instance based at least in part on the first gameplay state.

VII. Alternatives and Variations

Numerous embodiments are described in this disclosure, and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" " (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A gaming device comprising one or more processors and a memory, the memory storing computer-executable instructions which, when executed, cause the one or more processors to perform operations, comprising:

determining that a game is to be played on the gaming device in a first game type;

receiving player input selecting a first input level of a plurality of input levels;

determining one or more gameplay outcomes for the game at the first input level;

saving a first set of state information associated with the first input level, wherein the first set of state information comprises a number of remaining gameplay instances of the game at the first input level;

determining that a game is to be played on the gaming device in a second game type;

receiving player input selecting a second input level of the plurality of input levels;

determining one or more gameplay outcomes for the game at the second input level; and saving a second set of state information associated with the second input level, wherein the second set of state information comprises a number of remaining gameplay instances of the game at the second input level.

2. The gaming device of claim 1, wherein the first input level comprises a first number or range of credits.

3. The gaming device of claim 2, wherein the second input level comprises a second number or range of credits.

4. The gaming device of claim 3, wherein the first input level is different than the second input level.

5. The gaming device of claim 1, wherein the first game type is associated with a first return to player (RTP) level.

6. The gaming device of claim 5, wherein the second game type is associated with a second RTP level.

7. The gaming device of claim 6, wherein the first RTP level is different than the second RTP level.

8. The gaming device of claim 1, wherein the first game type includes a reel associated with at least a first dynamic symbol.

9. The gaming device of claim 8, wherein the second game type includes a reel associated with at least a second dynamic symbol.

10. The gaming device of claim 9, wherein the first dynamic symbol is selected from a first set of symbols, wherein the second dynamic symbol is selected from a second set of symbols, and wherein the first set of symbols is different than the second set of symbols.

11. The gaming device of claim 1, wherein the instructions, when executed, further cause the one or more processors to perform operations, comprising:

receiving player input selecting the first input level;

loading the saved first set of state information; and determining one or more gameplay outcomes for the game at the first input level.

12. The gaming device of claim 1, wherein the instructions to determine one or more gameplay outcomes for the game at the first input level further comprise instructions that, when executed, cause the one or more processors to perform operations, comprising:

determining one or more gameplay outcomes for the game at the first input level based, at least in part, on at least one message received from a first server computer.

13. The gaming device of claim 12, wherein the instructions to determine one or more gameplay outcomes for the game at the second input level further comprise instructions that, when executed, cause the one or more processors to perform operations, comprising:

determining one or more gameplay outcomes for the game at the second input level based, at least in part, on at least one message received from the first server computer.

14. One or more non-transitory computer-readable storage media storing computer-executable instructions which, when executed by one or more processors, cause the one or more processors to perform operations, comprising:

determining that a game is to be played on a gaming device in a first game type;

receiving player input selecting a first input level of a plurality of input levels;

determining one or more gameplay outcomes for the game at the first input level;

saving a first set of state information associated with the first input level, wherein the first set of state information comprises a number of remaining gameplay instances of the game at the first input level;

determining that a game is to be played on the gaming device in a second game type;

receiving player input selecting a second input level of the plurality of input levels;

determining one or more gameplay outcomes for the game at the second input level; and saving a second set of state information associated with the second input level, wherein the second set of state information comprises a number of remaining gameplay instances of the game at the second input level.

15. The one or more non-transitory computer-readable storage media of claim 14, wherein the instructions, when executed, further cause the one or more processors to perform operations, comprising:

receiving player input selecting the first input level;

loading the saved first set of state information; and determining one or more gameplay outcomes for the game at the first input level.

16. The one or more non-transitory computer-readable storage media of claim 14, wherein the instructions to determine one or more gameplay outcomes for the game at the first input level further comprise instructions that, when executed, cause the one or more processors to perform operations, comprising:

determining one or more gameplay outcomes for the game at the first input level based, at least in part, on at least one message received from a first server computer.

17. The one or more non-transitory computer-readable storage media of claim 16, wherein the instructions to determine one or more gameplay outcomes for the game at the second input level further comprise instructions that, when executed, cause the one or more processors to perform operations, comprising:

determining one or more gameplay outcomes for the game at the second input level based, at least in part, on at least one message received from the first server computer.

18. A server device comprising one or more processors and one or more memories, the one or more memories storing computer-executable instructions which, when executed, cause the one or more processors to perform operations, comprising:

receiving an indication that a game is to be played on a gaming device in a first game type;

receiving an indication that a player has selected a first input level of a plurality of input levels on the gaming device;

determining, at the server device, one or more gameplay outcomes for the game at the first input level;

transmitting, over a network to the gaming device, a first message comprising the one or more determined gameplay outcomes for the game at the first input level;

saving, in the one or more memories, a first set of state information associated with the first input level, wherein the first set of state information comprises a number of remaining gameplay instances of the game at the first input level;

receiving an indication that a game is to be played on the gaming device in a second game type;

receiving an indication that a player has selected a second input level of the plurality of input levels;

determining, at the server device, one or more gameplay outcomes for the game at the second input level;

transmitting, over the network to the gaming device, a second message comprising the one or more determined gameplay outcomes for the game at the second input level; and saving in the one or more memories, a second set of state information associated with the second input level, wherein the second set of state information comprises a number of remaining gameplay instances of the game at the second input level.

19. The server device of claim 18, wherein the first message further instructs the gaming device to display the one or more gameplay outcomes for the game at the first input level on a display of the gaming device.

20. The server device of claim 19, wherein the second message further instructs the gaming device to display the one or more gameplay outcomes for the game at the second input level on a display of the gaming device.

21. The gaming device of claim 1, wherein the first game type and the second game type are concurrently available to the player.

* * * * *